(12) United States Patent  (10) Patent No.: US 7,751,675 B2
Holmberg et al. (45) Date of Patent: Jul. 6, 2010

(54) WALL BOX ADAPTED TO BE MOUNTED AT A MID-SPAN ACCESS LOCATION OF A TELECOMMUNICATIONS CABLE

(75) Inventors: Matthew Holmberg, Le Center, MN (US); James J. Solheid, Lakeville, MN (US); Erik Gronvall, Bloomington, MN (US); Paula Rudenick, Eden Prairie, MN (US); Thomas Marcouiller, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/332,468

(22) Filed: Dec. 11, 2008

(65) Prior Publication Data

US 2009/0202214 A1 Aug. 13, 2009

Related U.S. Application Data

(60) Provisional application No. 61/007,278, filed on Dec. 11, 2007.

(51) Int. Cl.
*G02B 6/00* (2006.01)
(52) U.S. Cl. .................. 385/135; 385/134; 385/136; 385/137; 385/138; 385/139; 385/140
(58) Field of Classification Search .......... 385/134–140
See application file for complete search history.

(56) References Cited

U.S. PATENT DOCUMENTS

| 4,805,979 | A | 2/1989 | Bossard et al. |
| 5,080,459 | A | 1/1992 | Wettengel et al. |
| 5,133,039 | A | 7/1992 | Dixit |
| 5,313,546 | A | 5/1994 | Toffetti |
| 5,479,533 | A | 12/1995 | Tanaka |

(Continued)

FOREIGN PATENT DOCUMENTS

DE 38 25 756 C1 9/1989

(Continued)

OTHER PUBLICATIONS

Invitation to Pay Additional Fees with Partial International Search mailed Apr. 15, 2009.

(Continued)

*Primary Examiner*—Charlie Peng
*Assistant Examiner*—Guy G Anderson
(74) *Attorney, Agent, or Firm*—Merchant & Gould P.C.

(57) ABSTRACT

The present disclosure relates to a wall box adapted to be mounted at a mid-span access location of a fiber optic telecommunications cable. The wall box includes an enclosure having a main body with an open front side. The enclosure also includes a front cover for opening and closing the open front side of the main body. The wall box defining first and second cable entrance/exit openings positioned at opposite sides of the enclosure. The main body defines an open region through an exterior wall of the main body. The open region extends from the first cable entrance/exit opening to the second cable entrance/exit opening. The enclosure also includes a cable cover that is mounted to the main body to cover the open region. The cable cover is a separate component from the front cover.

18 Claims, 22 Drawing Sheets

U.S. PATENT DOCUMENTS

| | | | |
|---|---|---|---|
| 5,495,549 | A | 2/1996 | Schneider et al. |
| 5,631,993 | A | 5/1997 | Cloud et al. |
| 5,652,820 | A | 7/1997 | Glaser et al. |
| 5,692,299 | A | 12/1997 | Daems et al. |
| 5,754,723 | A | 5/1998 | Fremgen |
| 5,754,724 | A | 5/1998 | Peterson et al. |
| 5,778,122 | A | 7/1998 | Giebel et al. |
| 5,790,739 | A | 8/1998 | Strause |
| 5,790,740 | A | 8/1998 | Cloud et al. |
| 5,790,741 | A | 8/1998 | Vincent et al. |
| 5,825,964 | A | 10/1998 | Goetter et al. |
| 5,862,290 | A | 1/1999 | Burek et al. |
| 5,883,999 | A | 3/1999 | Cloud et al. |
| 5,884,001 | A | 3/1999 | Cloud et al. |
| 5,884,002 | A | 3/1999 | Cloud et al. |
| 5,884,003 | A | 3/1999 | Cloud et al. |
| 5,982,870 | A | 11/1999 | Pershan et al. |
| 6,152,767 | A | 11/2000 | Roosen et al. |
| 6,175,079 | B1 | 1/2001 | Johnston et al. |
| 6,226,434 | B1 | 5/2001 | Koshiyama et al. |
| 6,249,632 | B1 | 6/2001 | Wittmeier et al. |
| 6,275,639 | B1 | 8/2001 | Bolt et al. |
| 6,275,640 | B1 | 8/2001 | Hunsinger et al. |
| 6,385,381 | B1 * | 5/2002 | Janus et al. ............ 385/135 |
| 6,411,767 | B1 | 6/2002 | Burros et al. |
| 6,483,977 | B2 | 11/2002 | Battey et al. |
| 6,507,691 | B1 | 1/2003 | Hunsinger et al. |
| 6,539,160 | B2 | 3/2003 | Battey et al. |
| 6,542,688 | B1 | 4/2003 | Battey et al. |
| 6,621,975 | B2 | 9/2003 | Laporte et al. |
| 6,661,961 | B1 * | 12/2003 | Allen et al. ............ 385/135 |
| 6,721,484 | B1 * | 4/2004 | Blankenship et al. ....... 385/135 |
| 6,766,094 | B2 | 7/2004 | Smith et al. |
| 6,788,786 | B1 | 9/2004 | Kessler et al. |
| 6,797,878 | B1 | 9/2004 | Radelet |
| 6,798,967 | B2 | 9/2004 | Battey et al. |
| 6,856,748 | B1 | 2/2005 | Elkins, II et al. |
| 6,926,449 | B1 * | 8/2005 | Keenum et al. ............ 385/76 |
| 6,963,689 | B2 | 11/2005 | Battey et al. |
| 7,220,144 | B1 | 5/2007 | Elliot et al. |
| 7,239,789 | B2 | 7/2007 | Grubish et al. |
| 7,330,546 | B2 | 2/2008 | Kessler et al. |
| 7,589,277 | B2 | 9/2009 | Kessler et al. |
| 2005/0175307 | A1 | 8/2005 | Battey et al. |
| 2005/0271344 | A1 | 12/2005 | Grubish et al. |
| 2006/0083475 | A1 | 4/2006 | Grubish et al. |
| 2008/0279521 | A1 * | 11/2008 | Kowalczyk et al. ......... 385/135 |

FOREIGN PATENT DOCUMENTS

| | | |
|---|---|---|
| EP | 0 637 767 A2 | 2/1995 |
| EP | 0 797 114 A2 | 9/1997 |
| EP | 1 203 974 A2 | 5/2002 |
| EP | 1 832 907 A1 | 9/2007 |
| EP | 1 870 750 A2 | 12/2007 |
| GB | 2 367 379 A | 4/2002 |
| WO | WO 98/08125 | 2/1998 |

OTHER PUBLICATIONS

International Search Report and Written Opinion mailed Feb. 26, 2009.

International Search Report and Written Opinion mailed Jun. 30, 2009.

* cited by examiner

WALL BOX ADAPTED TO BE MOUNTED AT A MID-SPAN ACCESS LOCATION OF A TELECOMMUNICATIONS CABLE

CROSS REFERENCE TO RELATED APPLICATIONS

The present application claims priority to U.S. Provisional Patent Application Ser. No. 61/007,278, filed Dec. 11, 2007 and entitled "Wall Box Adapted to be Mounted at a Mid-Span Access Location of a Telecommunications Cable," which is hereby incorporated by reference in its entirety.

TECHNICAL FIELD

The principles disclosed herein relate to fiber optic cable systems. More particularly, the present disclosure relates to fiber optic cable systems for providing fiber to the premises.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown in FIG. 1, the network 100 may include a central office 110 that connects a number of end subscribers 115 (also called end users 115 herein) in a network. The central office 110 may additionally connect to a larger network such as the Internet (not shown) and a public switched telephone network (PSTN). The network 100 may also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network can be aerial or housed within underground conduits (e.g., see conduit 105).

The portion of network 100 that is closest to central office 110 is generally referred to as the F1 region, where F1 is the "feeder fiber" from the central office. The F1 portion of the network may include a distribution cable having on the order of 12 to 48 fibers; however, alternative implementations may include fewer or more fibers. The portion of network 100 that includes an FDH 130 and a number of end users 115 may be referred to as an F2 portion of network 100. Splitters used in an FDH 130 may accept a feeder cable having a number of fibers and may split those incoming fibers into, for example, 216 to 432 individual distribution fibers that may be associated with a like number of end user locations.

Referring to FIG. 1, the network 100 includes a plurality of break-out locations 125 at which branch cables are separated out from main cable lines. Breakout locations can also be referred to as tap locations, drop cable locations, splice locations or branch locations. Branch cables can also be referred to as drop cables, drop lines, breakout cables or stub cables. Branch cables are often connected to drop terminals 104 that include connector interfaces for facilitating coupling the fibers of the branch cables to a plurality of different subscriber locations. Breakout locations are often enclosed by a field mounted enclosure which protects optical splices (e.g., fusion or mechanical splices) or other types of optical couplings (e.g., connectorized optical couplings) provide at the breakout location. Since breakout locations are often provided at mid-span locations on the main cable being accessed, it desirable for field mounted enclosures to be readily mountable at mid-span access locations without requiring the main cable to be "threaded" lengthwise through the enclosure.

Fiber optic networks can extend to multi-dwelling units such as apartment buildings and condominiums. FIG. 2 shows a fiber optic network including a cable 150 routed into a multi-dwelling unit 152. Within the multi-dwelling unit 152, branch cables/fibers are optically coupled to the fibers of the cable 150 at optical coupling locations (e.g., fusion splices, mechanical splices or connectorized optical couplings). The optical coupling locations can be enclosed within one or more wall boxes that are typically equipped with doors/covers that can be opened to provide easy access to the optical coupling locations. The wall boxes are typically provided at different floors of the multi-dwelling unit with each wall box having optical coupling locations corresponding to a plurality of different subscribers (e.g., each resident on a given floor).

SUMMARY

Certain aspects of the disclosure relate to a wall box for use in a fiber optic network. The wall box can include structure that facilitates mounting the wall box at a mid-span access location of a fiber optic cable.

A variety of additional aspects will be set forth in the description that follows. The aspects can relate to individual features and to combinations of features. It is to be understood that both the forgoing general description and the following detailed description are exemplary and explanatory only and are not restrictive of the broad concepts upon which the embodiments disclosed herein are based.

DETAILED DESCRIPTION

Figure 1:
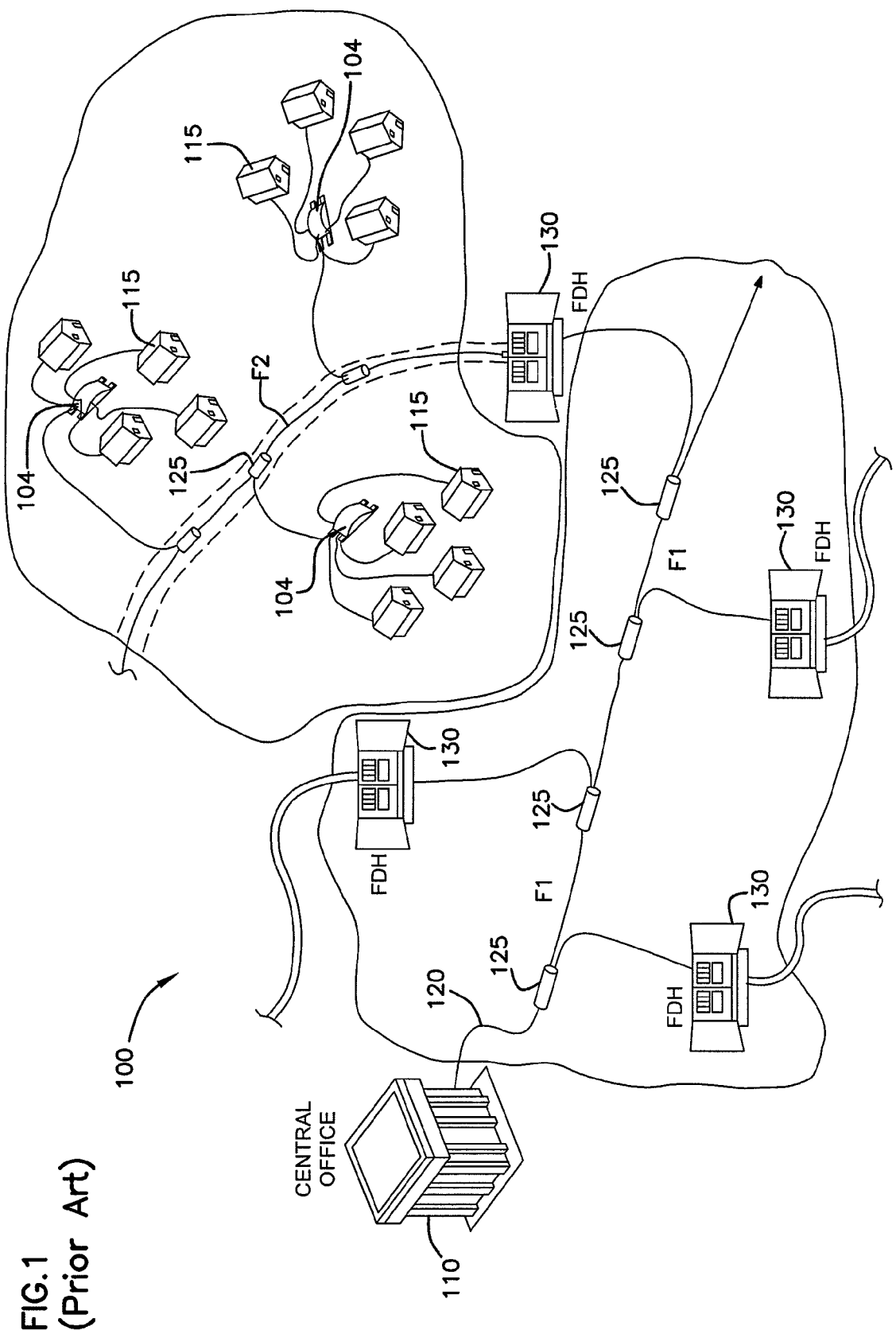
FIG. 1 shows a prior art passive fiber optic network.
Figure 2:
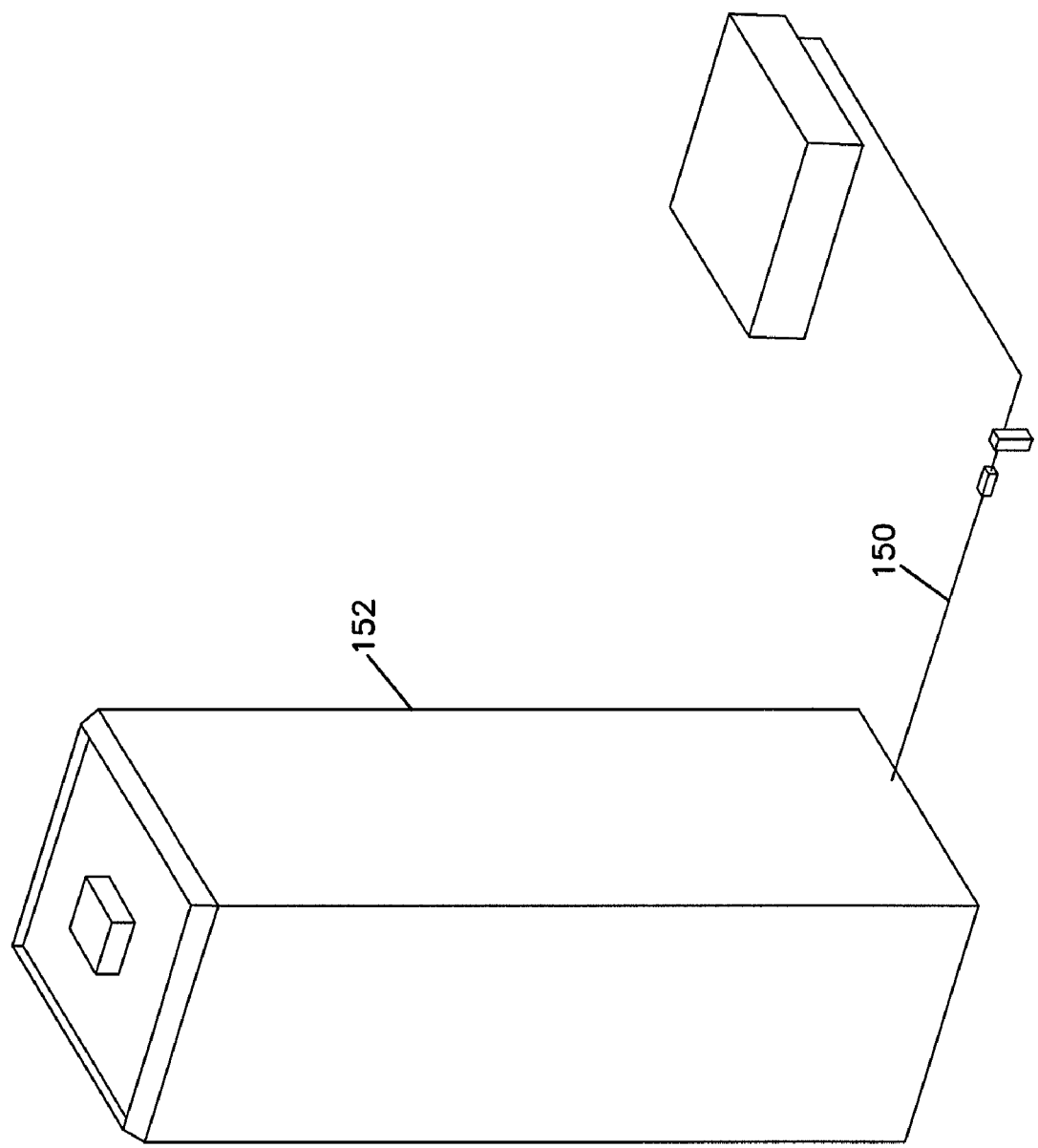
FIG. 2 shows another prior art passive fiber optic network.

The present disclosure relates generally to wall boxes configured to be easily mounted at mid-span locations along the length of a fiber optic telecommunications cable. It is preferred for wall boxes in accordance with the principles of the present disclosure to be used for indoor applications such as multi-dwelling units, or commercial buildings where a plurality of subscribers is located. However, it will be appreciated that wall boxes in accordance with the principles of the present disclosure can be used for either indoor or outdoor applications wherever it is desired to easily mount an enclosure at a mid-span location of a telecommunications cable. Certain embodiments can be sealed for use in below grade applications (e.g., for use in hand holes).

FIGS. 3-12 show a wall box 200 having features in accordance with the principles of the present disclosure. The wall box 200 includes a generally rectangular enclosure 202 including a front side 204, a back side 206, a top side 208, a bottom side 210, a right side 212 and a left side 214. The enclosure 202 includes a main body 216 defining an open front side 218. The enclosure 202 also includes a front cover 220 pivotally mounted to the main body 216. The front cover 220 is movable between a first position (shown in FIG. 3) where the open front side 218 of the main body 216 is covered, and a second position (shown in FIG. 4) where the open front side 218 of the main body 216 is exposed so as to allow access into the interior of the enclosure 202 from the front side 204 of the enclosure 202. The main body 216 also defines rear open regions 222 located at the left and right rear corners of the enclosure 202. The rear open regions 222 are shown extending from the top side 208 to the bottom side 210 of the enclosure 202. The enclosure 202 also includes cable covers 226 that attach to the main body 216 to cover rear open regions 222. The wall box 200 further includes a splice tray 230 that mounts in the interior of the enclosure 202 and is accessible through the open front side 218 of the main body 216 when the front cover 220 is open.

Figure 4:
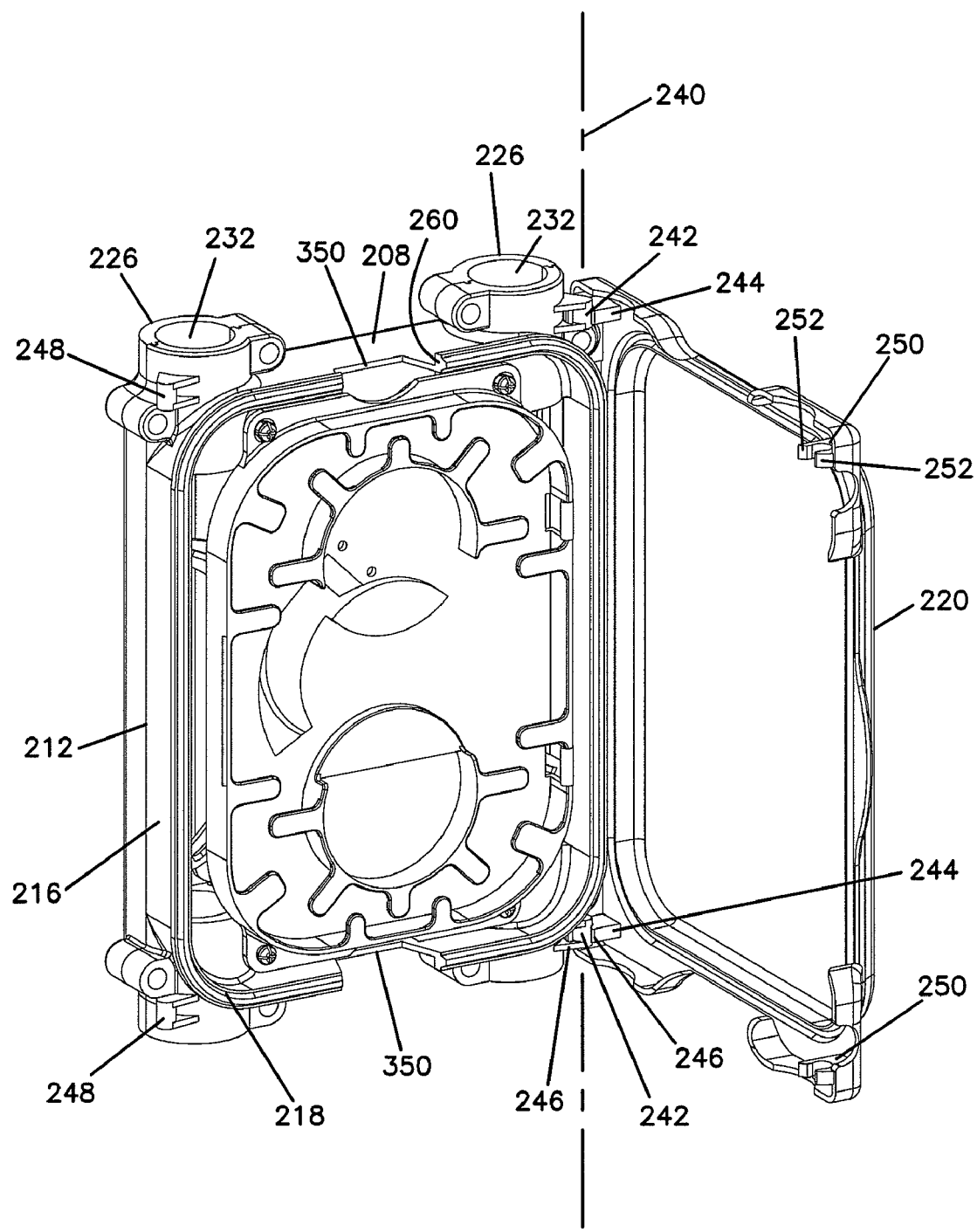
FIG. 4 is a front perspective view of the wall box of FIG. 3 with a front door of the wall box open.
Figure 5:
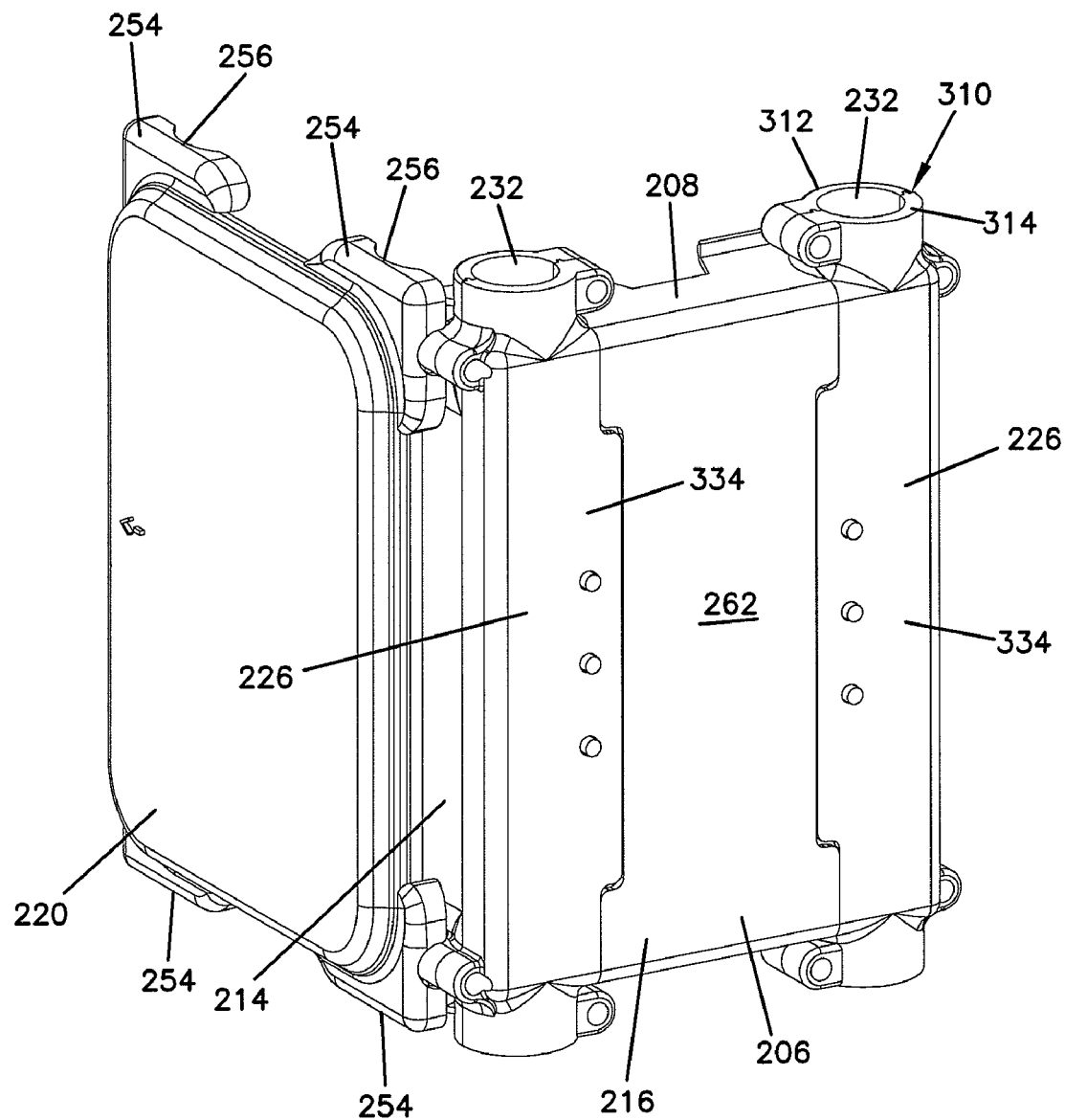
FIG. 5 is a rear perspective view of the wall box of FIG. 3 with the front door open.

For ease of explanation, the various sides of the enclosure have been described as being "top", "bottom", "right" and "left" sides so as to correspond with the orientation of the enclosure shown at FIG. 4. However, it will be appreciated that when used in the field, the enclosure can be mounted at any orientation. For example, if the distribution cable is routed horizontally, the sides 208, 210 would be oriented to define the left and right sides of the enclosure, and the sides 212, 214 would be oriented to define the top and bottom sides of the enclosure.

The cable covers 226 are removable from the main body 216 of the enclosure 202 to facilitate positioning the wall box 200 at a mid-span access location of a telecommunications cable. By removing one of the cable covers 226, a mid-span location of a telecommunications cable can be positioned within the enclosure 202 without requiring the telecommunications cable to be threaded lengthwise through the enclosure 202. For example, with one of the cable covers 226 removed, the mid-span location of the cable can be inserted into the enclosure 202 through the corresponding open region 222 of the main body 216. The cable cover 226 is then attached to the main body 216 to cover the corresponding open region 222 and enclose the mid-span location of the cable within the enclosure 202. Cable exit/enter openings 232 are provided at the top and bottom sides 208, 210 of the enclosure 202 for allowing the portions of the telecommunications cable located upstream and downstream of the mid-span access location to enter and exit the enclosure 202. Two of the cable exit/enter openings 232 are co-axially aligned and positioned at top and bottom ends of the cable cover 226 located at the left, rear corner of the enclosure 202, and the other two cable exit/enter openings 232 are co-axially aligned and positioned at top and bottom ends of the cable cover 226 located at the right, rear corner of the enclosure 202.

Figure 3:
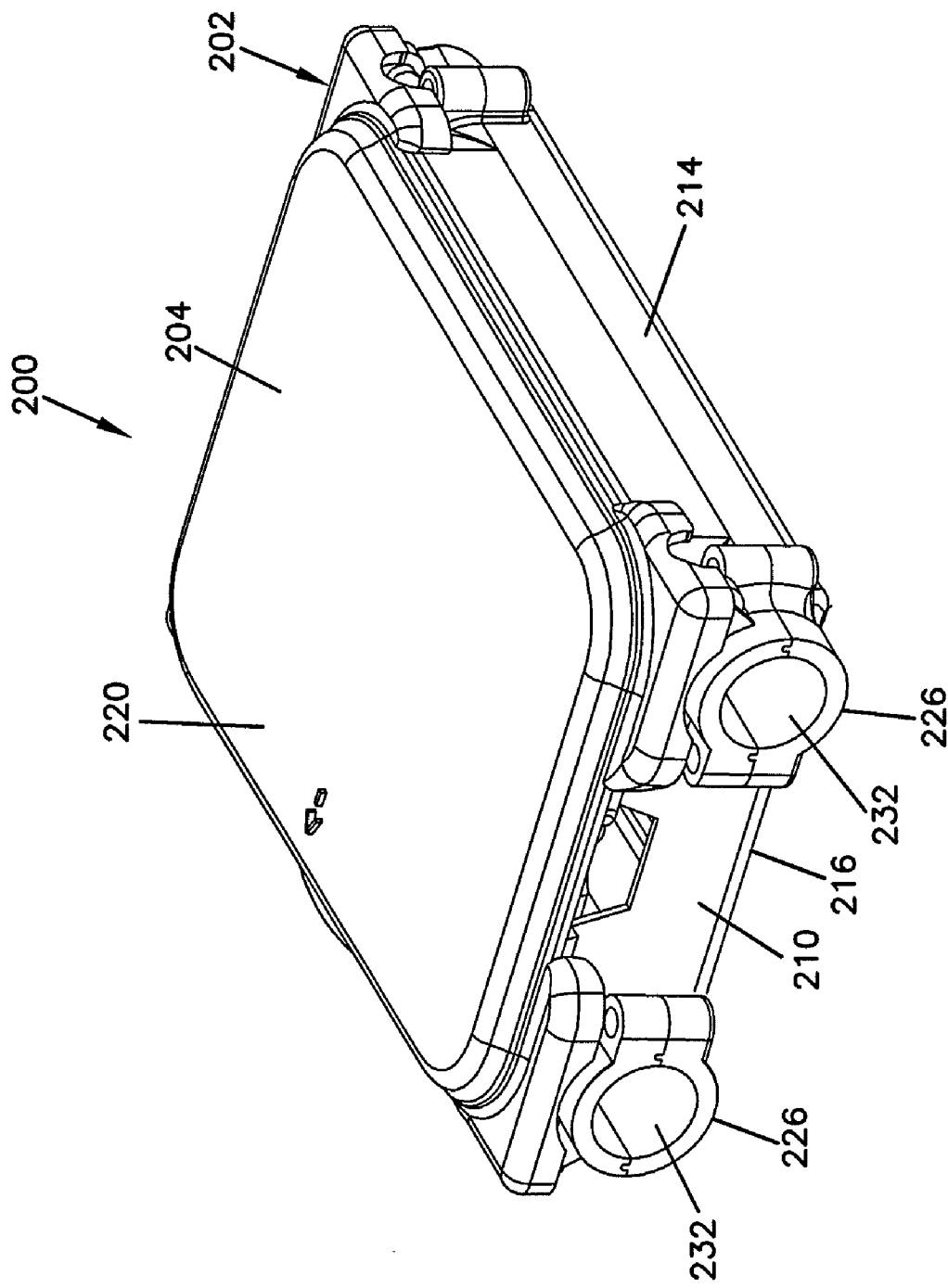
FIG. 3 is a front, left and bottom side perspective view of a wall box in accordance with the principles of the present disclosure.

As shown best at FIGS. 4-11, the front cover 220 is pivotally connected to the main body 216 at a vertical pivot axis 240 (see FIG. 4) located generally adjacent a front left edge of the main body 216. The pivotal connection between the front cover 220 and the main body 216 is provided by a hinge arrangement including a pair of hinge pins 242 integrally formed with the main body 216 and a pair of hinge pin receivers 244 integrally formed with a back side of the front cover 220. The hinge pin receivers 244 each include a pair of opposing, flexible arms 246 that defines a pocket into which the hinge pins 242 can be snapped to provide the pivotal connection between the front cover 220 and the main body 216. The enclosure 202 also includes a latching arrangement for securing the front cover 220 in the closed position. The latching arrangement includes a pair of latching pins 248 integrally formed with the main body 216 adjacent the front right edge of the main body 216. The latching arrangement also includes a pair of latching pin receivers 250 integrally formed with the back side of the front cover 220. Each of the latching pin receivers 250 includes a pair of opposing latching arms 252 that define a pocket for receiving the latching pins 248. When the front cover 220 is closed, the latching pins 248 snap between the latching arms 252 and into the latching pin receiver pocket to secure the front cover 220 in the closed position. Contoured enlargements 254 are provided at the corners of the front cover 220 for reinforcing the front cover 220 and for providing sufficient material for supporting the hinge pin receivers 244 and the latching pin receivers 250. As shown in FIG. 3, the contoured enlargements 254 have curved rear portions 256 that receive corresponding curved portions of the main body 216 when the front cover 220 is in the closed position.

It will be appreciated that the hinge pins 242 and the latching pins 248 have the same configuration. Therefore, the front cover 220 can be rotated 180 degrees with respect to the orientation shown at FIG. 3, and the hinge pin receivers 244 can be snapped over the latching pins 248 so that the latching pins 248 function as hinge pins for providing a hinge at the front, right edge of the main body. As shown in FIG. 4, the pockets of the hinge pin receivers 244 have open sides that do not face rearwardly from the back side of the front cover 220 (e.g., the open sides face laterally toward the latching pin receivers 250. In contrast, the latching pin receivers 250 define pockets with open sides that face rearwardly from the back side of the front cover 220. Therefore, when the front cover 220 is snapped closed after having snapped the hinge pin receivers 244 over the hinge pins 242, it is not possible to disengage the hinge pin receivers 244 from their respective hinge pins. Instead, opening of the front cover is achieved by disengaging the latching pin receivers 250 from their corresponding pins.

A sealed relationship is preferably provided between the front cover 220 and the main body 216 when the front cover 220 is in the closed position. For example, in one embodiment, the main body 216 can define a front edge 260 that extends generally around the perimeter of the open front side 218 and fits within a corresponding channel or receptacle defined on the back side of the front cover 220. In other embodiments, a gasket can be provided about the perimeter of the open front side 218 so as to provide a seal between the front cover 220 and the main body 216.

Figure 6:
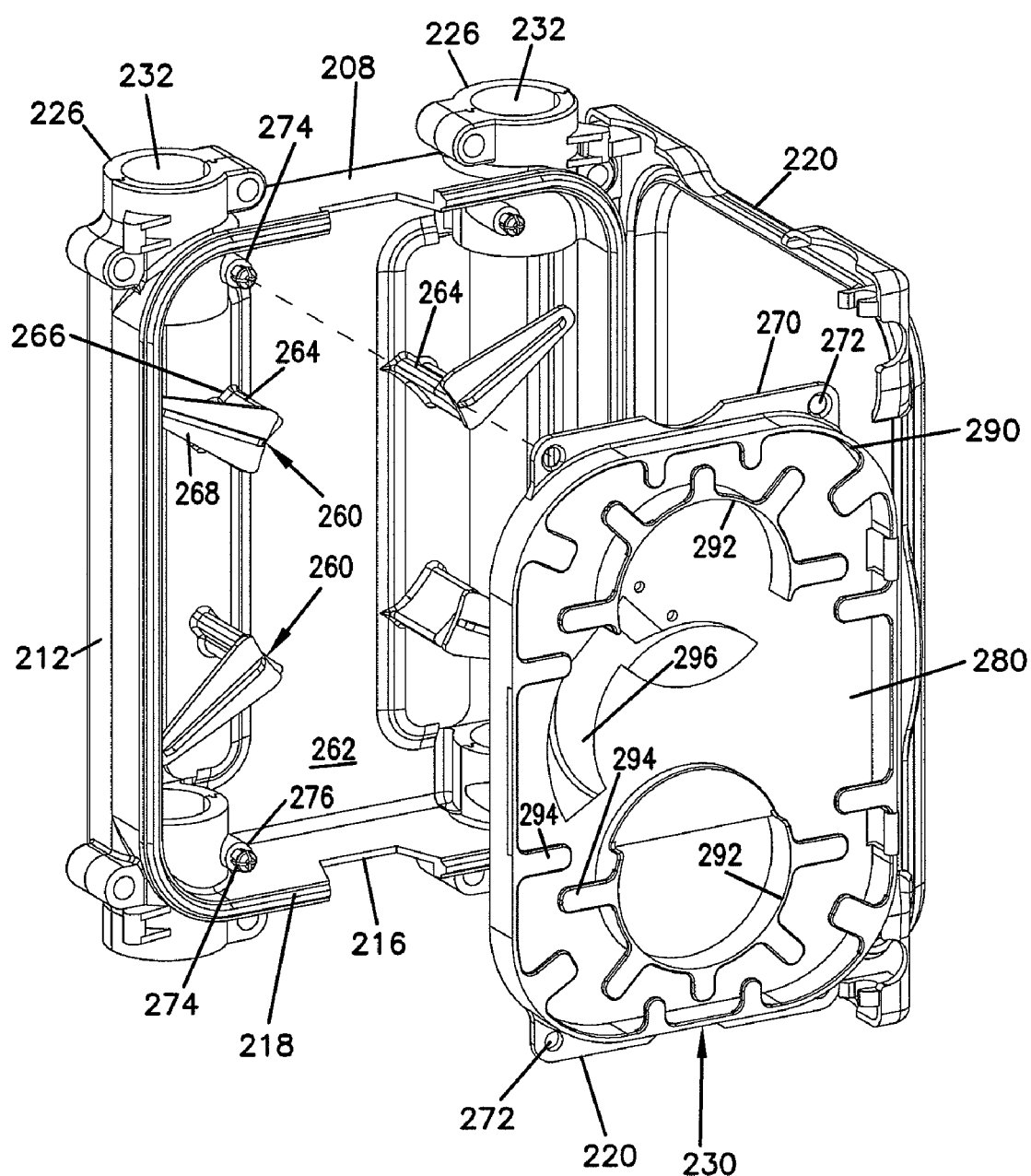
FIG. 6 is a front perspective view of the wall box of FIG. 3 with the front door open and with a splice tray exploded outwardly from the interior of the wall box.
Figure 10:
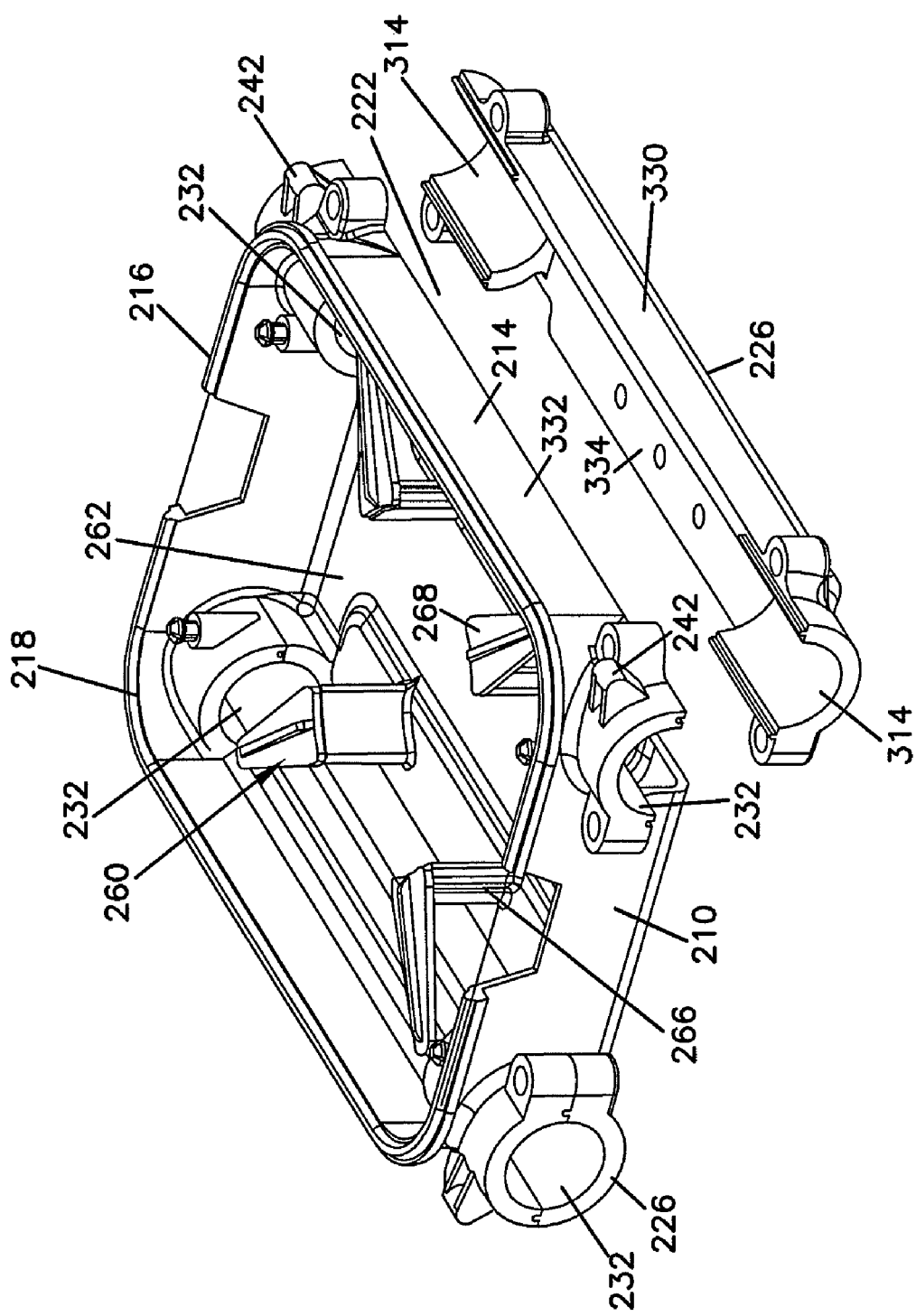
FIG. 10 is an exploded view of the wall box of FIG. 3 with the front cover removed and with the right, rear cable cover exploded outwardly from the main body of wall box.
Figure 11:
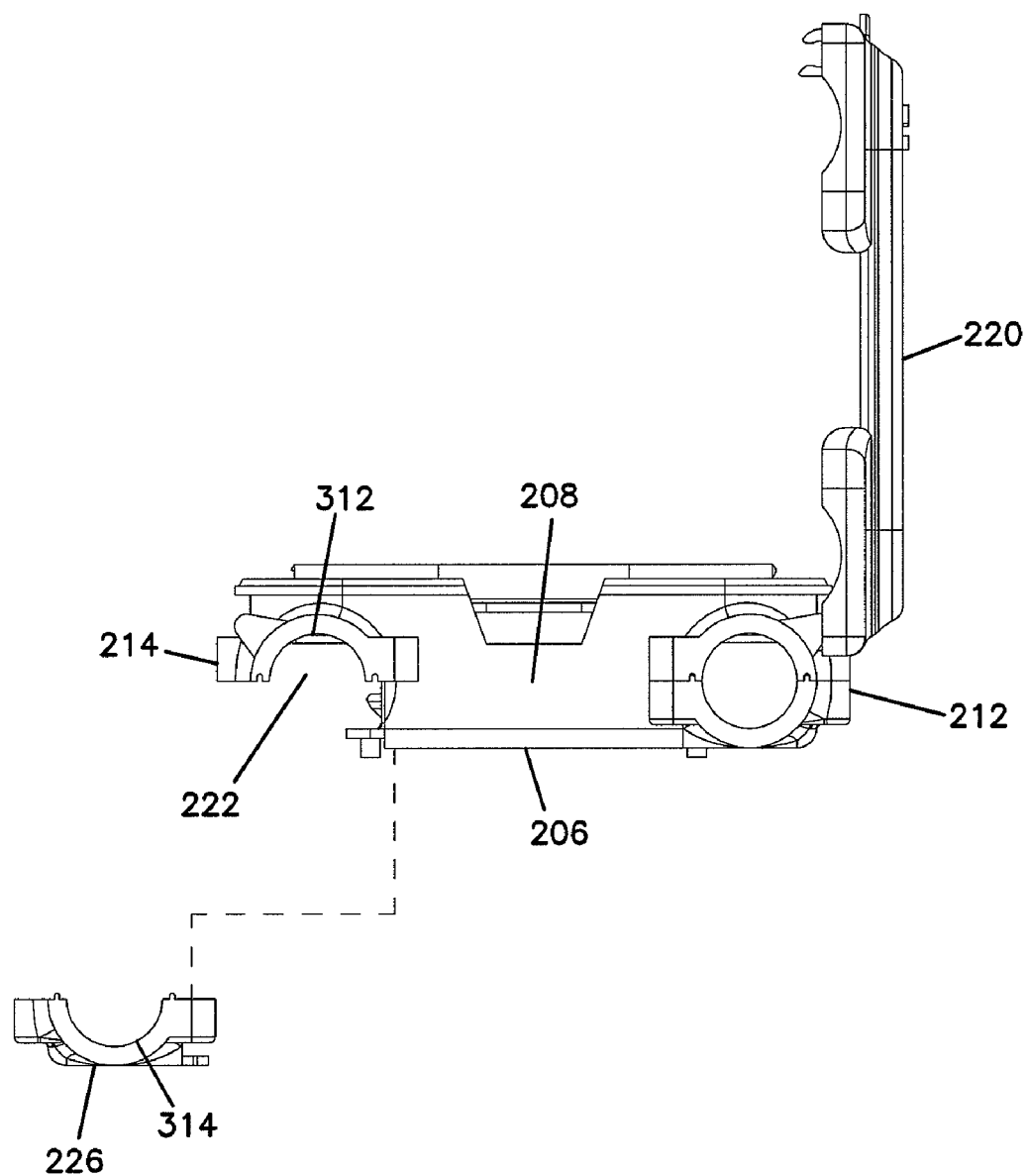
FIG. 11 is a top view of the wall box of FIG. 3 with the front cover open and a left, rear cable cover exploded outwardly from the main body of the wall box.

A variety of cable/fiber management structures are provided within the interior of the enclosure 202. For example, as shown in FIGS. 6 and 10, four cable management members 260 are shown integrally formed with a back wall 262 of the main body 216. Each of the cable management members 260 includes a bend radius limiter 264 that projects forwardly from the rear wall 262 of the main body 216. Each of the bend radius limiters 264 defines an outer curved surface 266 having a curvature that satisfies the minimum bend radius requirements of the optical fiber desired to be stored within the enclosure 202. The bend radius limiters 264 are positioned within the enclosure 202 so as to define a spool arrangement configured for allowing excess fiber optic cable to be spooled or looped around the four bend radium limiters 264. The cable management members 260 also include cable retention members 268 that project laterally outwardly from front ends of the bend radius limiters 264. The cable retention members 268 function to prevent cable looped around the bend radius limiters 264 from migrating forwardly past the front ends of the bend radius limiters 264.

The splice tray 230 also provides cable/fiber management within the interior of the enclosure 202. The splice tray 230 includes flanges 270 defining fastener openings 272 adapted to align with corresponding bosses 274 that are integrally formed with the main body 216 of the enclosure 202. Each of the bosses 274 defines an internally threaded opening into which a threaded fastener can be threaded. Therefore, by positioning the splice tray 230 so that the fastener openings 272 align with the internally threaded openings of the bosses 274, and then inserting fasteners 276 through the fastener openings 272 and into the bosses 274, the splice tray 230 can easily be fastened within the interior of the enclosure 202.

Figure 7:
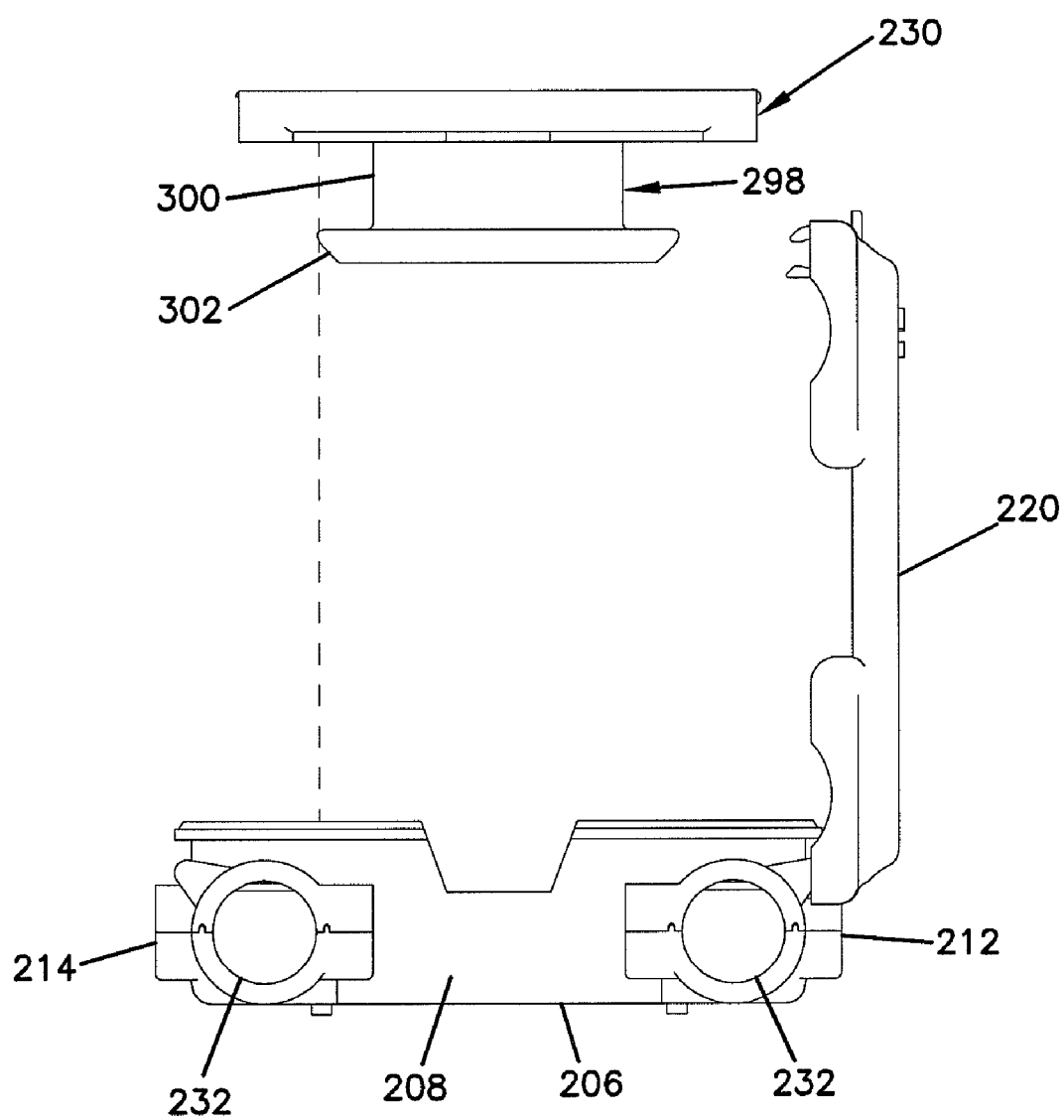
FIG. 7 is a top view of the wall box of FIG. 3 with the front door open and with the splice tray exploded outwardly from the interior of the wall box.

Referring to FIG. 7, the splice tray 230 includes a generally rectangular main panel 280 having rounded corners. A perimeter wall 290 projects forwardly from the main panel 280 and extends around the perimeter of the main panel 280. The rounded corners of the main panel 280 provide fiber bend radius protection. Two curved fiber storage walls 292 (e.g., partial spools) also project forwardly from the main panel 288. The fiber storage walls 292 have an outer curvature selected to provide bend radius protection to fibers routed about the exterior of the fiber storage walls 292. In use, excess fiber can be looped around the fiber storage walls 292 so as to form an elongated fiber storage loop at the front side of the main panel 280. Fiber retention fingers 294 project inwardly from the perimeter wall 290 and outwardly from the fiber storage walls 292 and function to assist in retaining fibers within the area defined between the wall 290 and the walls 292.

Figure 12:
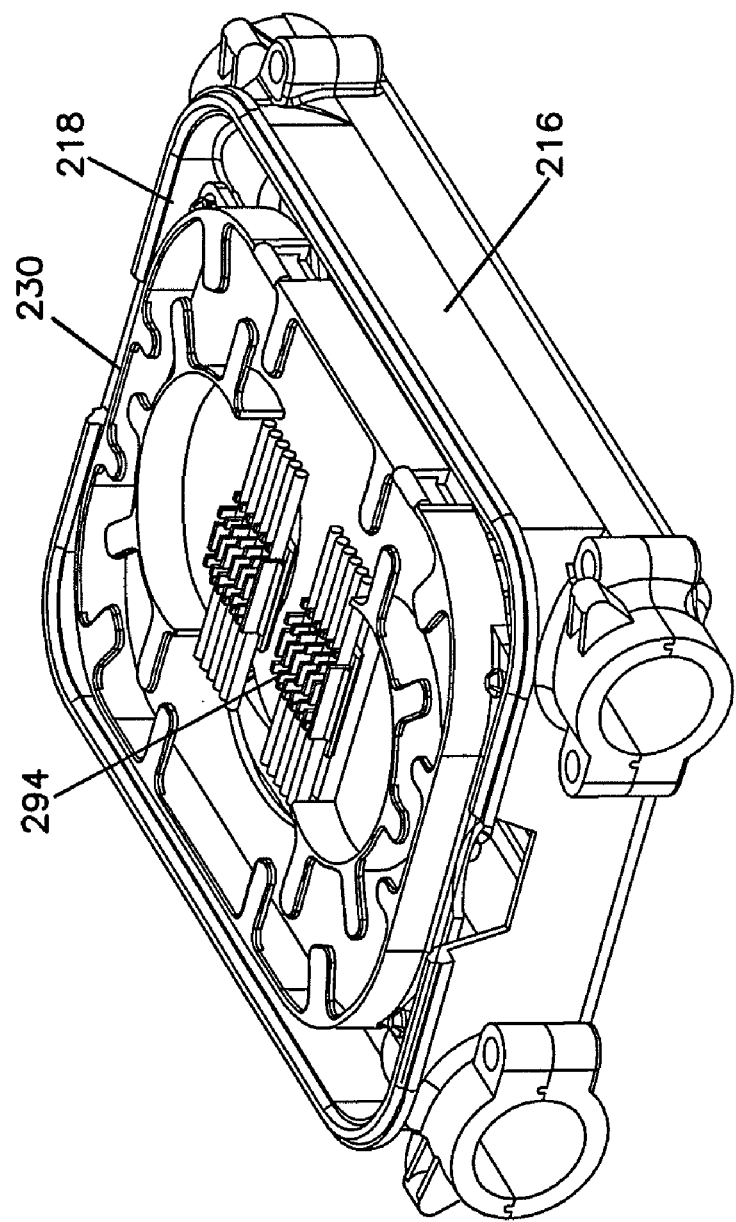
FIG. 12 shows the wall box of FIG. 3 with the front cover removed and fiber optic splices provided at the splice tray.

As shown in FIG. 12, splice sleeve holders 294 can be mounted to the main panel 280 in the region located between the fiber storage walls 292 (i.e., in a region bound by the elongated storage loop formed when a fiber is looped around the fiber storage walls 292). The splice sleeve holders 294 are adapted for holding splice sleeves used to provide mechanical support to a fusion splice formed between two optical fibers. One or more passages 296 can be defined through the main panel 280 for allowing optical fibers to be routed from a back side to a front side of the splice tray 230.

Referring to FIG. 7, the splice tray 230 also includes a spool structure 298 that projects rearwardly from the back side of the main panel 288. The spool structure 298 includes a cylindrical spool 300 about which excess fiber can be wrapped. The spool structure 298 also includes an annular flange 302 located at the rear end of the spool structure 298. The annular flange 302 assists in retaining fibers spooled about the spool 300 from sliding off the end of the spool. The annular flange 302 is sized to nest inside the bend radius limiters 264 of the main body 216 of the enclosure 202 when the splice tray 230 is mounted within the enclosure 202.

Each of the rear open regions 222 defined by the main body 216 is configured to allow a fiber optic cable to be mounted in a "pass-through" configuration within the enclosure 202. In this "pass-through" configuration, a mid-span access location of the cable is located within the enclosure 202, and upstream and downstream portions of the cable are routed in and out of the enclosure 202 through two of the aligned cable enter/exit openings 232. With one of the cable covers 226 removed from the main body 216, the corresponding rear open region 222 defines a continuously open region that extends from the location of one of the openings 232 vertically along the height of the enclosure 202 to its corresponding opening 232. The open region preferably has a width that is sufficiently large to allow a cable to be laterally inserted through the open region and into the interior of the enclosure 202. In a preferred embodiment, the width of the open region exceeds an outer diameter of the cable desired to be mounted within the enclosure 202 for the entire length of the open region.

Referring to FIGS. 5, 8, 9 and 11, cable clamping portions 310 are provided at each of the openings 232. Each cable clamping portion 310 is defined by a first half cylinder 312 integrally formed with the main body 216 and a second half cylinder 314 provided on one of the cable covers 226. Rails 316 provided at the second half cylinder 314 fit within corresponding slots 318 provided at the first half cylinder 312 to assist in maintaining alignment between the half cylinders 312, 314 during assembly and clamping. Bosses 320 are integrally formed with the cable covers 226 and corresponding bosses 322 are integrally formed with the main body 216. When the cable covers 226 are mounted at their corresponding rear open regions 222, the bosses 320, 322 align with one another so that fasteners can be inserted through the bosses 320, 322 to draw the half cylinders 314 toward the half cylinders 312 to provide a clamping action. The fasteners inserted through the bosses 320, 322 also function to secure the cable covers 226 to the main body 216.

When the wall box 200 is mounted at a mid-span access location of a cable, jacketed portions of the cable are preferably inserted between the half cylinders 312, 314 of two of the coaxially aligned clamping portions 310. When the fasteners are installed through the bosses 320, 322, the half cylinders 314 are drawn toward the half cylinders 312 causing the jacketed portions of the cable to be clamped between the half cylinders 312, 314. Preferably, the half cylinders 312, 314 provide mechanical retention of the cable and also provide a seal around the perimeter of the cable jacket. To accommodate cables having different outer diameters, it will be appreciated that inserts can be used within the clamping portions 310.

Figure 8:
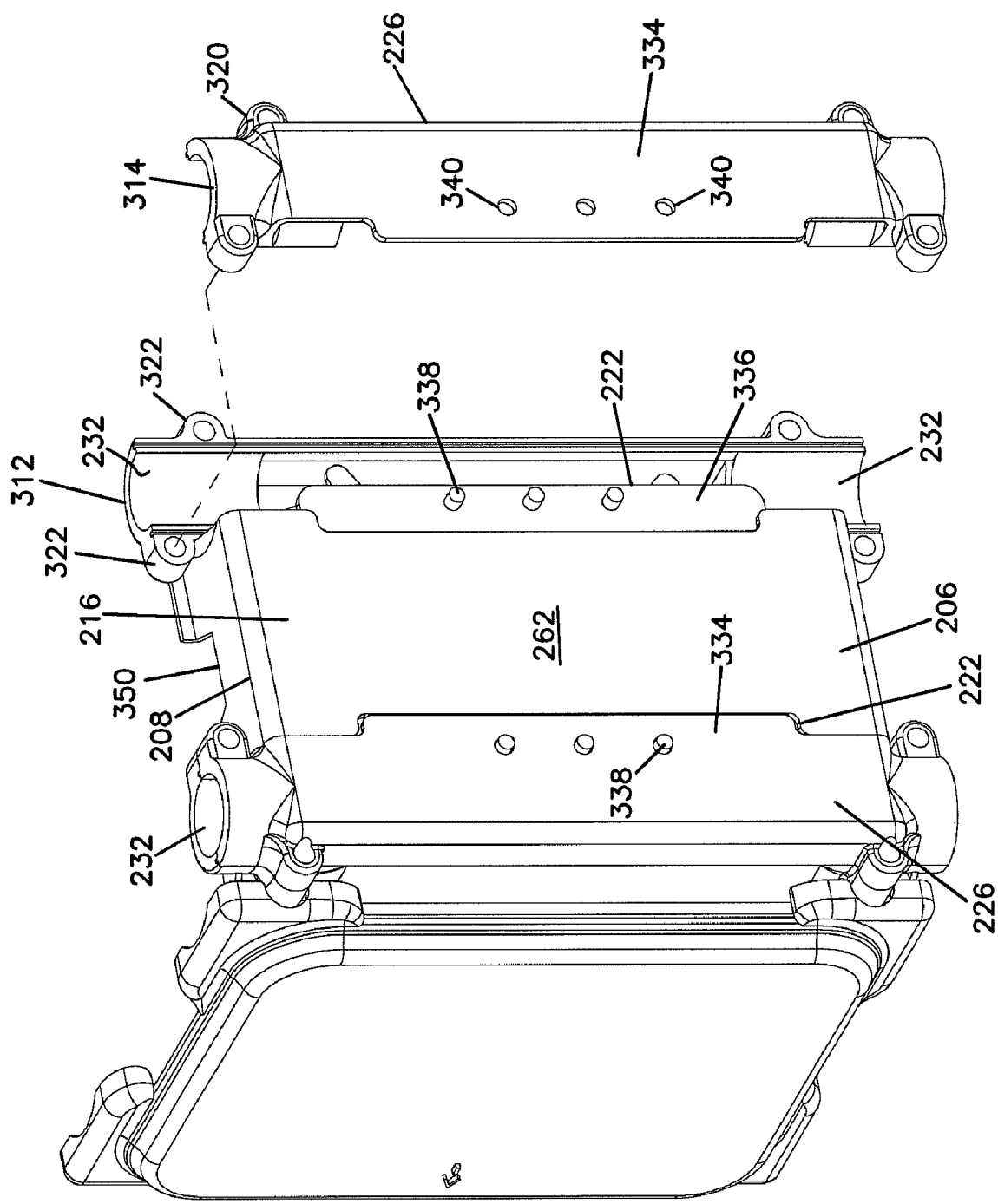
FIG. 8 is a rear perspective view of the wall box of FIG. 3 with the front door open and a right, rear cable cover exploded outwardly from a main body of the wall box.
Figure 9:
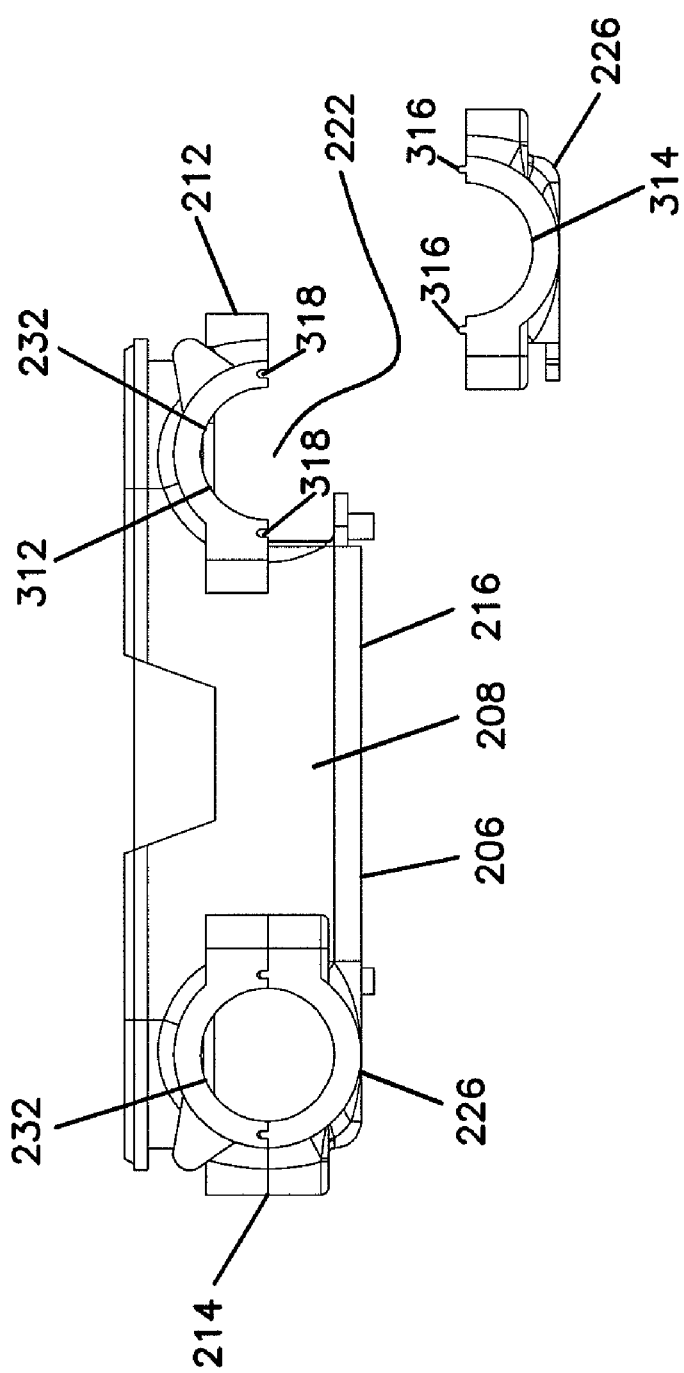
FIG. 9 is a top view of the wall box of FIG. 3 with the front cover closed and the right rear cable cover exploded outwardly from the main body of the wall box.

Referring to FIG. 10, where one of the cable covers 226 is shown exploded outwardly from the main body 216, the depicted cable cover 226 includes half cylinders 314 located at opposite ends of the cable cover 226. The cable cover 226 also includes a side wall 330 that cooperates with a corresponding side wall 332 of the main body 216 to form the left side 214 of the enclosure 202. The cable cover 226 also includes a rear wall 334 that cooperates with the rear wall 262 of the main body 216 to define the back side 206 of the enclosure 202. As best shown in FIG. 8, the rear wall 262 of the main body 216 defines a recessed region 336 that receives a portion of the rear wall 334 of the cable cover 226 such that the rear wall 334 of the cable cover 226 and the rear wall 262 of the main body 216 have a flush mounted configuration when the cable cover 226 is secured to the main body 216.

The enclosure 202 also includes lateral enforcement arrangements that provide lateral reinforcement to the cable covers 226 to prevent the cable covers 226 from moving laterally relative to the main body 216 when the cable covers 226 are mounted to the main body 216. As best shown in FIG. 8, the lateral reinforcing assembly includes a plurality of reinforcing pegs 338 provided at the recessed regions 336 of the rear wall 262 of the main body 216. When the cable covers 226 are mounted to the main body 216, reinforcing pegs 338 fit within corresponding openings 340 defined by the cable covers 226 to provide lateral reinforcement to the cable covers 226.

It is preferred for the wall box 200 to be configured to allow the wall box to be easily mounted to a vertical surface such as a pole or wall. In certain embodiments, mounting flanges can be integrally formed with the main body 216 for allowing the wall box 200 to be readily fastened to a wall, pole or other structure. In still other embodiments, the wall box 200 can be used in combination with a separate bracket arrangement that is pre-mounted to a structure such as a wall or pole and that receives or otherwise attaches to the wall box 200 to allow the wall box 200 to be readily mounted to the wall, pole or other structure. The cable cover 226 also includes an open side 333 positioned opposite from the side wall 330 for allowing cables to pass into and out of the interior of the main body 216.

To mount the wall box 200 at a corresponding mid-span location of a cable, the cable is initially prepared by stripping away the outer jacket of the cable for a desired length at the mid-span location. In one embodiment, about 4 feet of the outer jacket can be stripped. One of the cable covers 226 is then removed from the main body 216 of the enclosure 202 so as to expose the underlying rear open region 222. The stripped portion of the cable can then be spooled around the bend radius limiters 264 provided within the main body 216. With one end of the stripped region located adjacent to one of the clamping portions 310 and the other end of the stripped region positioned adjacent to the corresponding clamping portion 310. Jacketed portions of the cable located adjacent to the stripped portion are preferably inserted within the clamping portions 310. Thereafter, the cable cover 226 is fastened to the main body 216 thereby covering the rear open region 222 and causing the jacketed portions of the cable to be clamped within the clamping portions 310.

To access fibers within the wall box 200, selected fibers from the cable can be terminated (i.e., cut) adjacent one of the clamping portions 310 so as to provide a length of terminated fiber within the enclosure 202. The length of terminated fiber can be spooled around the spool structure 298 of the splice tray 230 for storage purposes. When it is desired to splice one of the terminated fibers to a distribution cable, the terminated fiber can be accessed from the spool structure 298 and routed through one of the openings 296 in the splice tray 230 to the front side of the splice tray 230. At the front side of the splice tray, the terminated optical fiber can be spliced to a corresponding fiber of another cable (e.g., a distribution cable) with the splice being mounted at the splice sleeve holder 294 as shown at FIG. 12. Excess fiber can be stored by wrapping the excess fiber around the fiber storage walls 292 at the front side of the splice tray 230. The cable to which the terminated fiber is spliced is preferably routed into the wall box 200 through one of the unused openings 232, or through openings 350 located a mid regions of the top and bottom sides 208, 210 of the main body 216. Gaskets can be provided at the openings 350 for sealing purposes.

For certain applications, both the openings 232 may be used. For example, for some applications, it may be desirable to pass two separate telecommunications cables through the wall box 200. For other applications or to facilitate cable routing, the same telecommunications cable may be passed through one of the openings 232, looped outside the wall box, and then passed back though the other opening 232.

Figure 14:
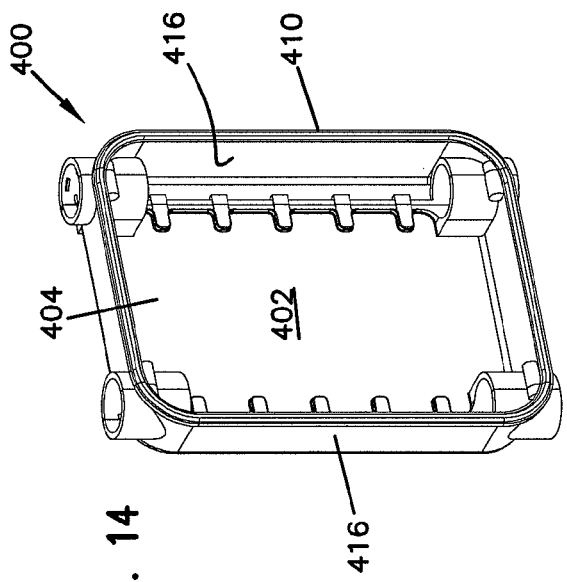
FIG. 14 is a front, top right side view of the wall box of FIG. 13 with the front cover removed.
Figure 13:
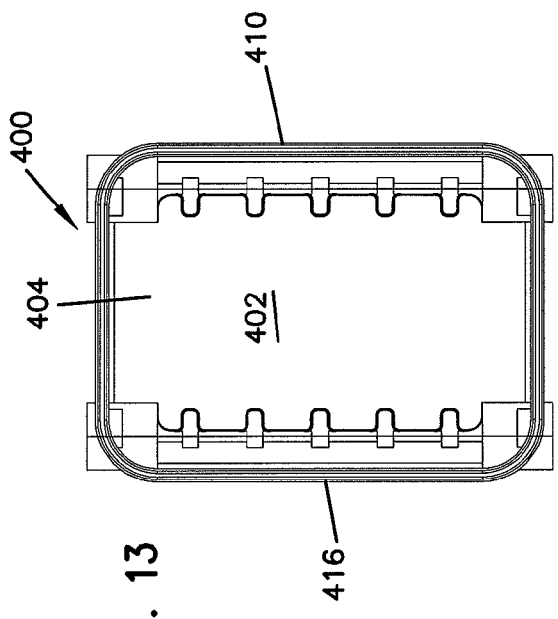
FIG. 13 is a front view of another wall box in accordance with the principles of the present disclosure with a front cover of the wall box removed.
Figure 15:
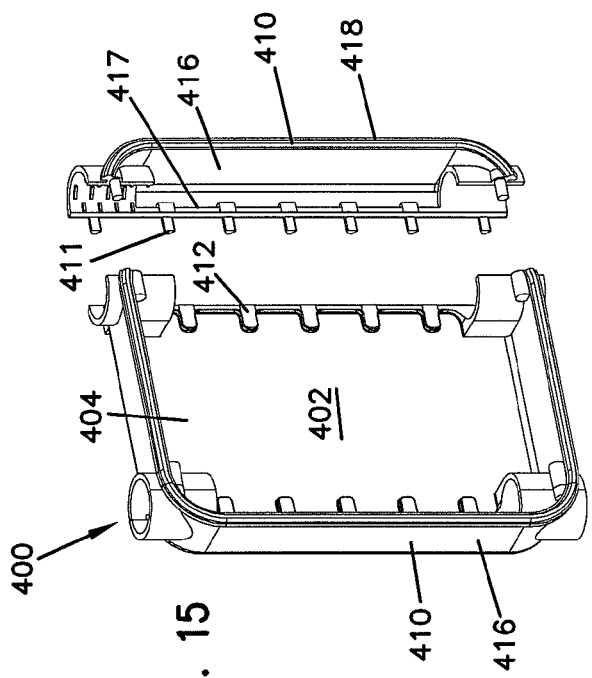
FIG. 15 is a front perspective view of the wall box of FIG. 13 with the front cover removed and the left, side cable cover removed from a main body of the wall box.

FIGS. 13-15 show a portion of an alternative wall box 400 having features in accordance with the principles of the disclosure. The wall box 400 includes many of the same structures as the wall box 200, except the wall box 400 has side open regions for laterally receiving a mid-span access location of a cable. The wall box 400 includes a main body 402 having a rear wall 404 and an open front. It will be appreciated that similar to the previously described wall box embodiment, a front cover can be pivotally mounted to the front of the main body so as to allow the open front of the main body 402 to be selectively opened or closed. Side open regions 422 are provided at left and right sides of the main body 402. Cable covers 410 mount to the main body 402 to cover the side open regions 422. The cable covers 410 are installed on the main body 402 by laterally inserting the cable covers toward the main body, and are removed by laterally moving the cable covers away from the main body. Alignment tabs 411 on the cable covers fit within corresponding receptacles 412 located at the rear wall 404 of the main body 402. Clamping portions are provided at cable enter/exit openings located at opposite ends of each of the cable covers. Each of the cable covers includes a rear wall 417 that cooperates with the rear wall 404 of the main body 402 to define the rear side of the wall box 400. Each of the cable covers also includes a side wall 416 that forms a full side of the wall box 400. Additionally, each of the covers includes a front edge portion 418 that cooperates with edge portions provided on the front side of the main body 216 to provide a sealing edge that extends around the perimeter of the front opening of the enclosure. The cover design disclosed in the embodiment of FIGS. 13-15 is advantageous because it allows the cable covers to be removed from the main body even when the rear wall of the main body is mounted to a structure such as a wall or a pole.

Figure 16:
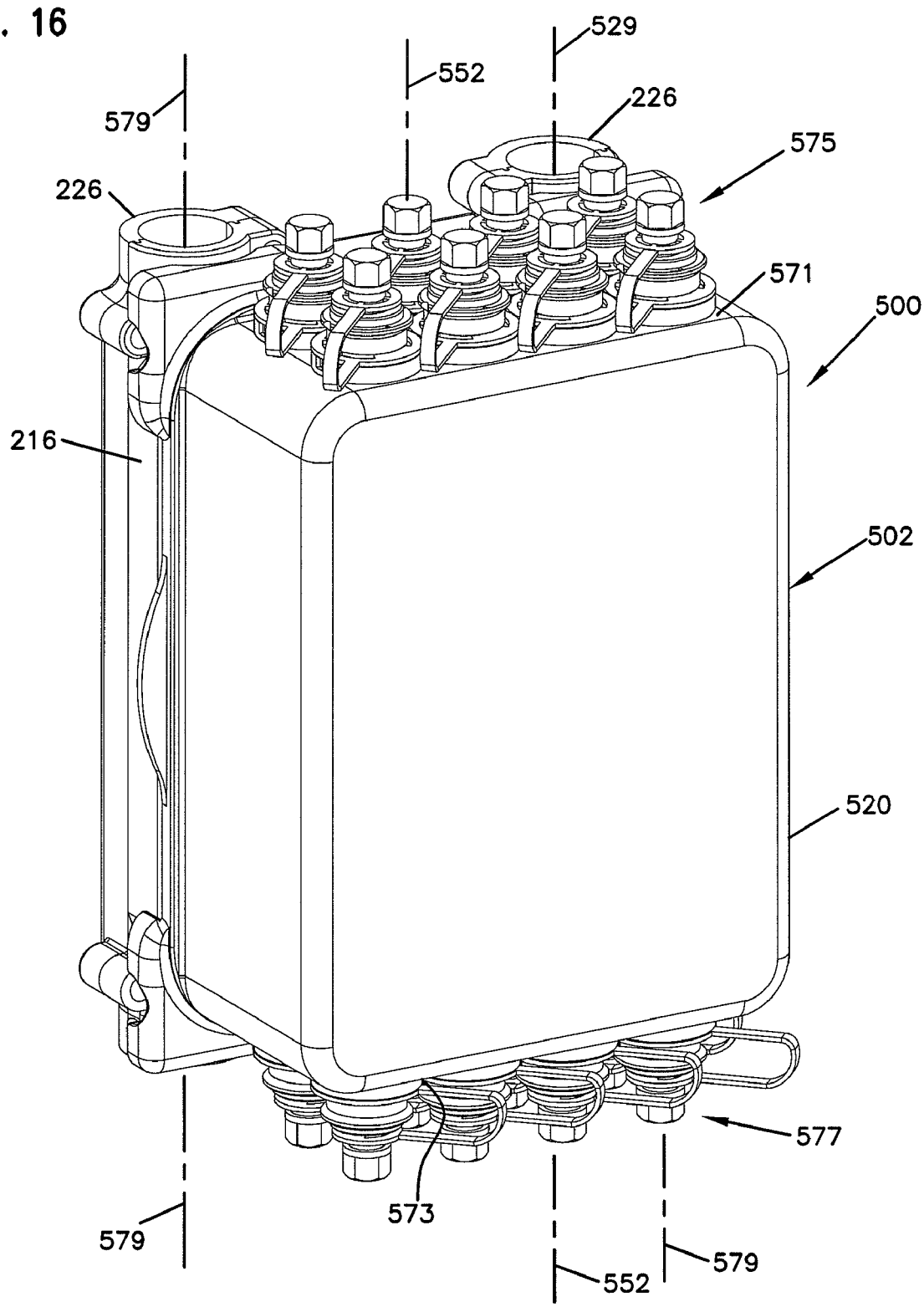
FIG. 16 is a front, perspective view of another wall box in accordance with the principles of the present disclosure.
Figure 17:
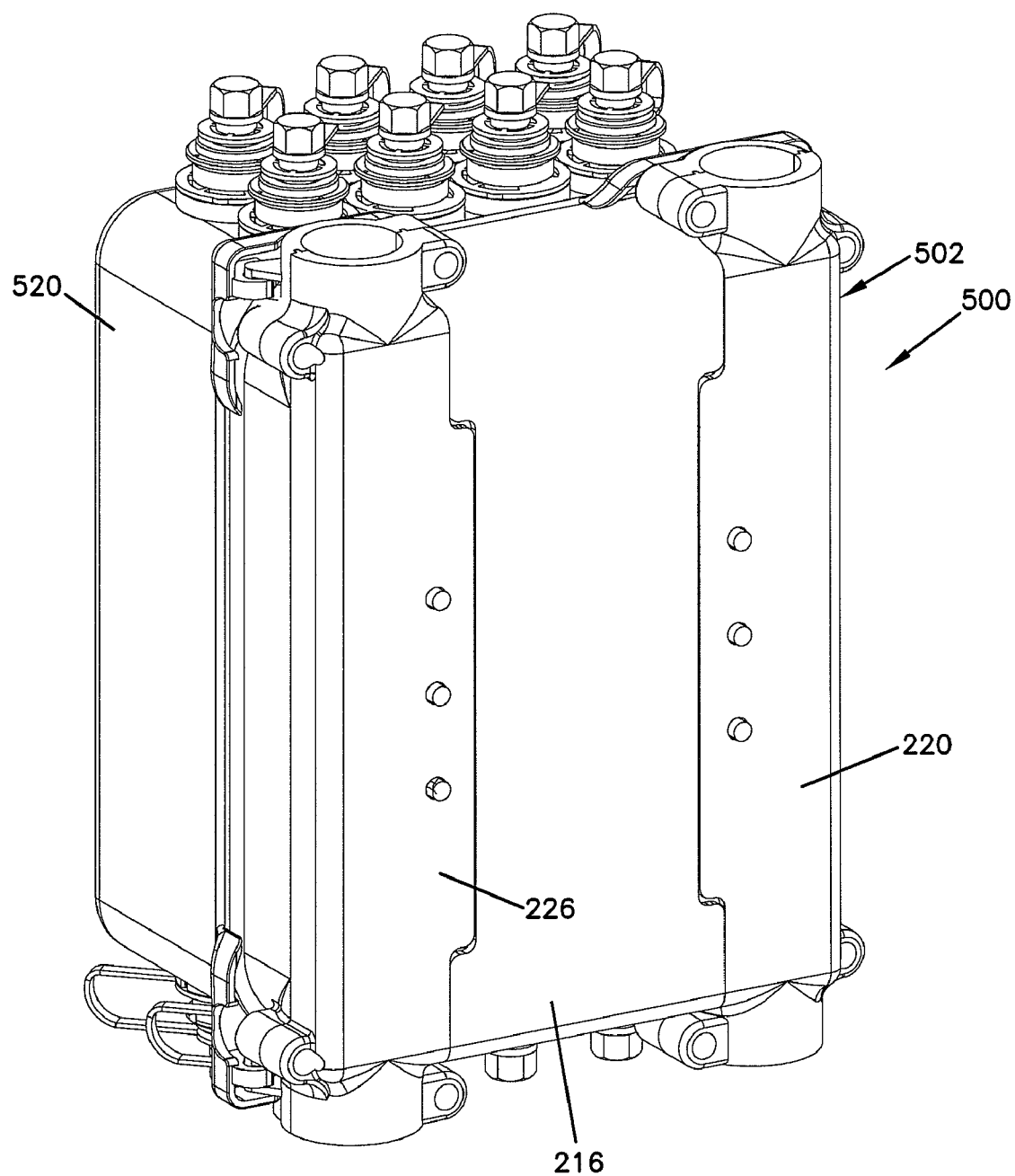
FIG. 17 is a rear, perspective view of the wall box of FIG. 16.
Figure 18:
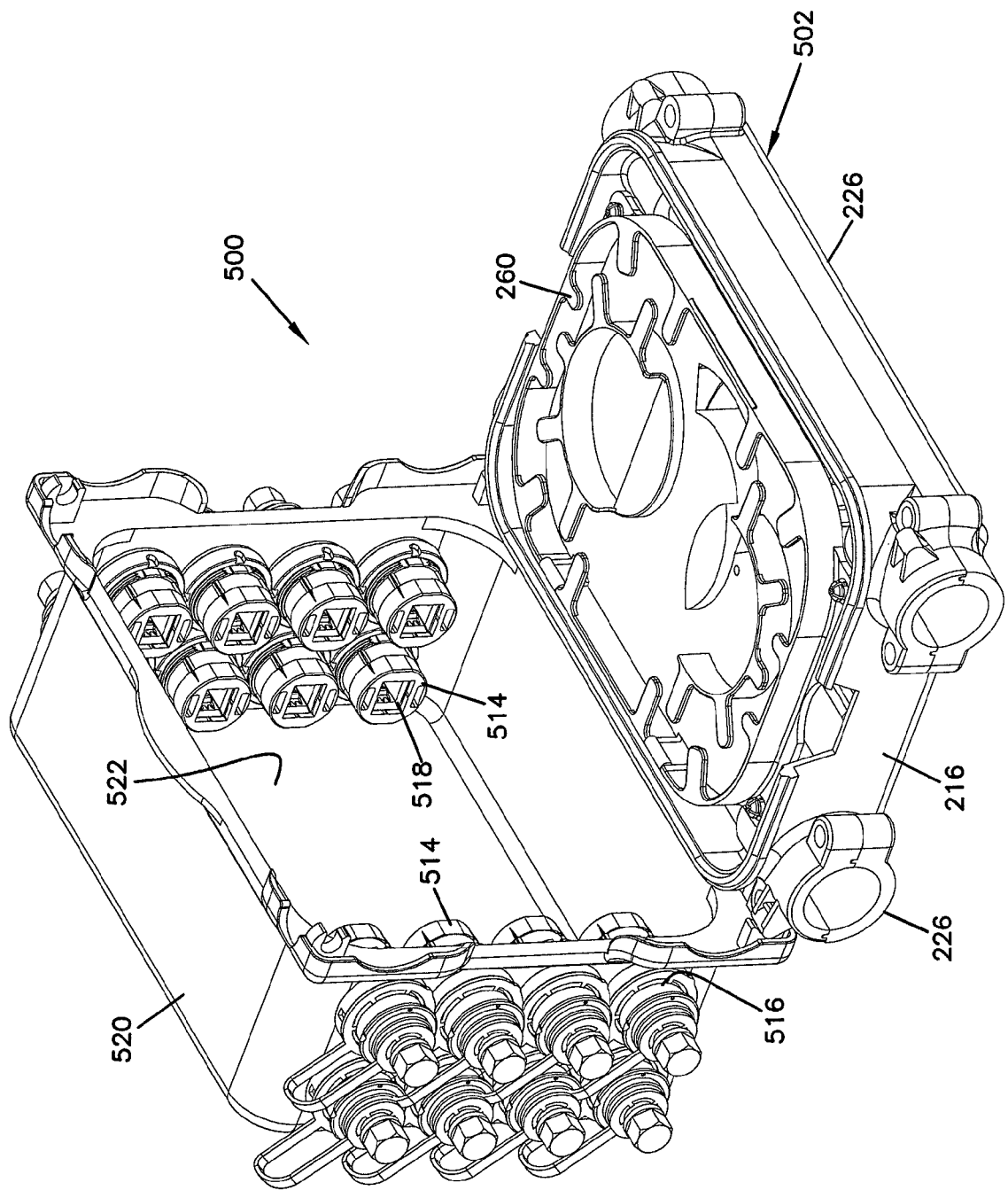
FIG. 18 shows the wall box of FIG. 16 with a front cover of the wall box open.

FIGS. 16-18 illustrate another wall box 500 having features in accordance with the principles of the present disclosure. The wall box 500 includes an enclosure 502 having the same main body 216, cable covers 226 and splice tray 230 as a wall box 200 of FIGS. 3-12. The wall box 500 includes a modified front cover 520 pivotally mounted to the main body 216. The front cover 520 is moveable between a first position (shown in FIG. 16) where the open front side 218 of the main body is covered, and a second position (shown in FIG. 18) where the open front side 218 of the main body 216 is exposed to allow access to the interior of the enclosure 502 from the front side of the enclosure 502. As shown in FIG. 18, the front cover 520 defines an internal cavity 522. A plurality of fiber optic adapters 514 are mounted to the front cover 520. Each of the fiber optic adapters 514 includes an inner port 518 positioned inside the internal cavity 522 of the front cover 520, and an outer port 516 positioned at an outer surface of the front cover 520. In use of the wall box 500, fibers from a mid-span access location of a cable passed through the wall box 500 are spliced to a plurality of fiber optic pigtails having connectorized ends. The connectorized ends of the pigtails are preferably inserted within the inner ports 518 of the fiber optic adapters 514. By plugging a connectorized end of a drop cable into an outer port 516 of one of the fiber optic adapters 514, the drop cable can be optically connected to one of the fibers of the cable passed through the wall box 500.

Referring back to FIG. 16, the front cover 520 includes a first adapter mounting wall 571 that faces in a first direction and a second adapter mounting wall 573 that faces in a second direction that is opposite from the first direction. The adapter mounting walls 571, 573 define mounting openings in which the fiber optic adapters 514 are mounted. A first group 575 of the fiber optic adapters 514 is mounted at the first adapter mounting wall 571 while a second group 577 of the fiber optic adapters 514 is mounted at the second adapter mounting wall 573. The first and second adapter mounting walls 571, 573 are arranged in planes that are generally perpendicular to main cable routing axes 579 (see FIG. 16) that pass through the cable exit/enter openings 232 of the main body 216 of the enclosure 502. The fiber optic adapters 514 define adapter axes 552 that are generally parallel to the through-cable routing axes 579. In this way, drop cables optically connected to the fiber optic adapters 514 can be routed away from the wall box 500 in directions generally parallel to a through-cable that passes through the wall box 500.

Figure 19:
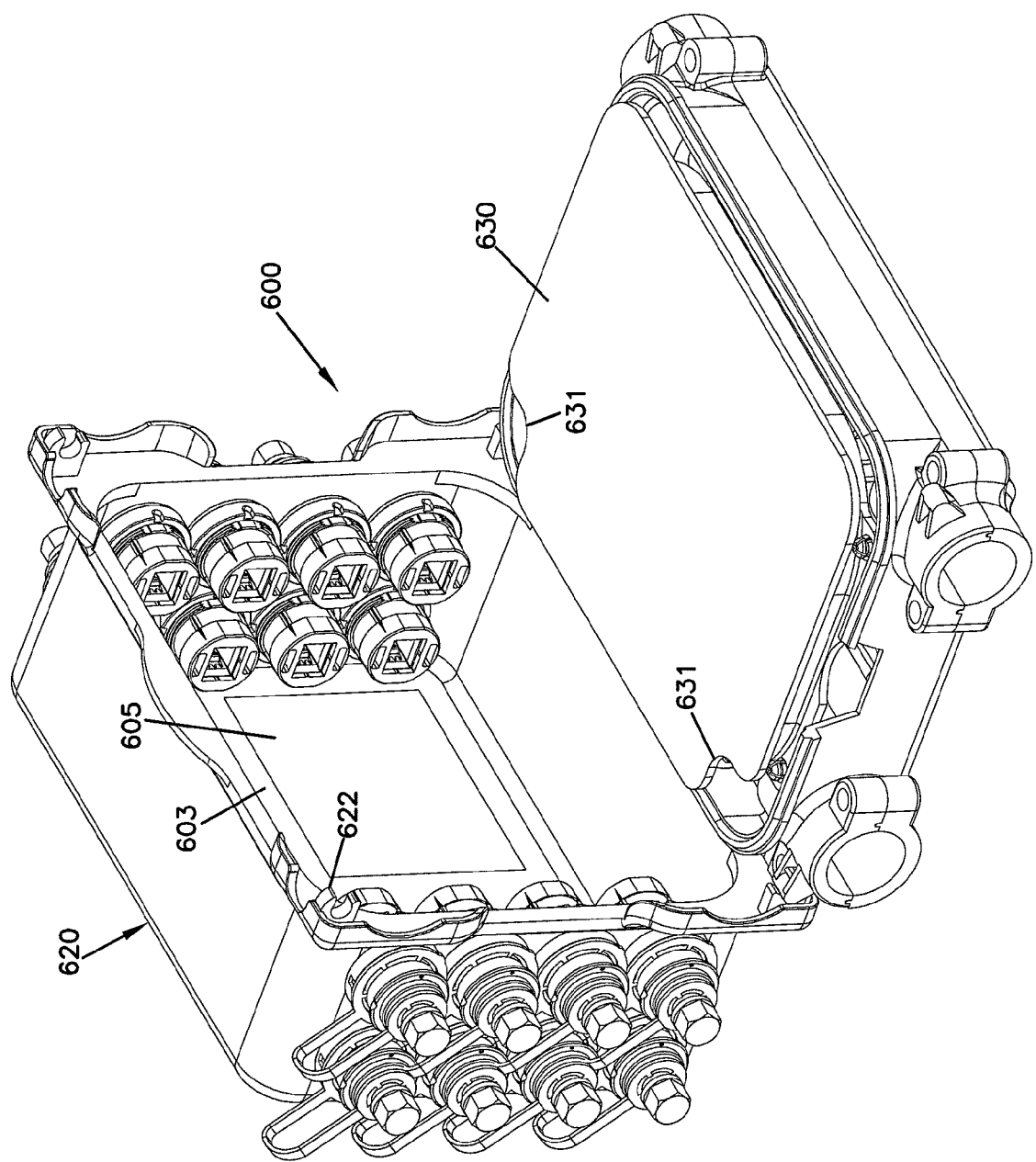
FIG. 19 shows still another wall box in accordance with the principles of the present disclosure.

As shown at FIG. 18, the back side of the front cover 520 is open such that when the front cover 520 is closed, the internal cavity 522 of the front cover 520 is in communication with the interior of the main body 216. FIG. 19 shows another wall box 600 having the same configuration as the wall box 500 except the wall box 600 includes a front cover 620 having a front wall 603 defining a front access door 605 for accessing an internal cavity 622 of the front cover 620. Also, the wall box 600 includes a divider 630 for separating the internal cavity 622 of the front cover 620 from the interior of the main body 216. As shown in FIG. 19, the divider 630 is an insert piece that is captured between the front cover 620 and the main body 216. The divider 630 defines openings 631 for allowing connectorized pigtails to be routed from the interior of the main body 216 into the internal cavity of the front cover 620 so that the connectorized ends of the pigtails can be inserted into the inner ports of the fiber optic adapters 514 mounted to the front cover 620. In alternative embodiments, the divider can be integrally formed with the back side of the front cover 620.

The divider 630 provides the wall box 620 with a 2-compartment configuration. The first compartment corresponds with the internal cavity 622 of the front cover 620 and is accessed through the front access door 605 of the front cover 620. Typically, a technician would access the internal cavity 622 through the front door 605 to perform maintenance on the fiber optic adapters 514 or the connectors mounted in the inner ports 518 of the fiber optic adapters 514. In contrast, the second compartment corresponding to the interior of the main body 216 would be accessed to perform functions such as splicing. In certain embodiments, a first lock can be provided at the front door 605 and a second lock can be used to lock the front cover 620 in the closed position. In this way, access to the different compartments could be limited to different personnel. For example, certain technicians may only have access to the internal cavity 622 of the front cover 620, other technicians may only have access to the internal cavity of the main body 216, and still other technicians may have access to both compartments.

Figure 20:
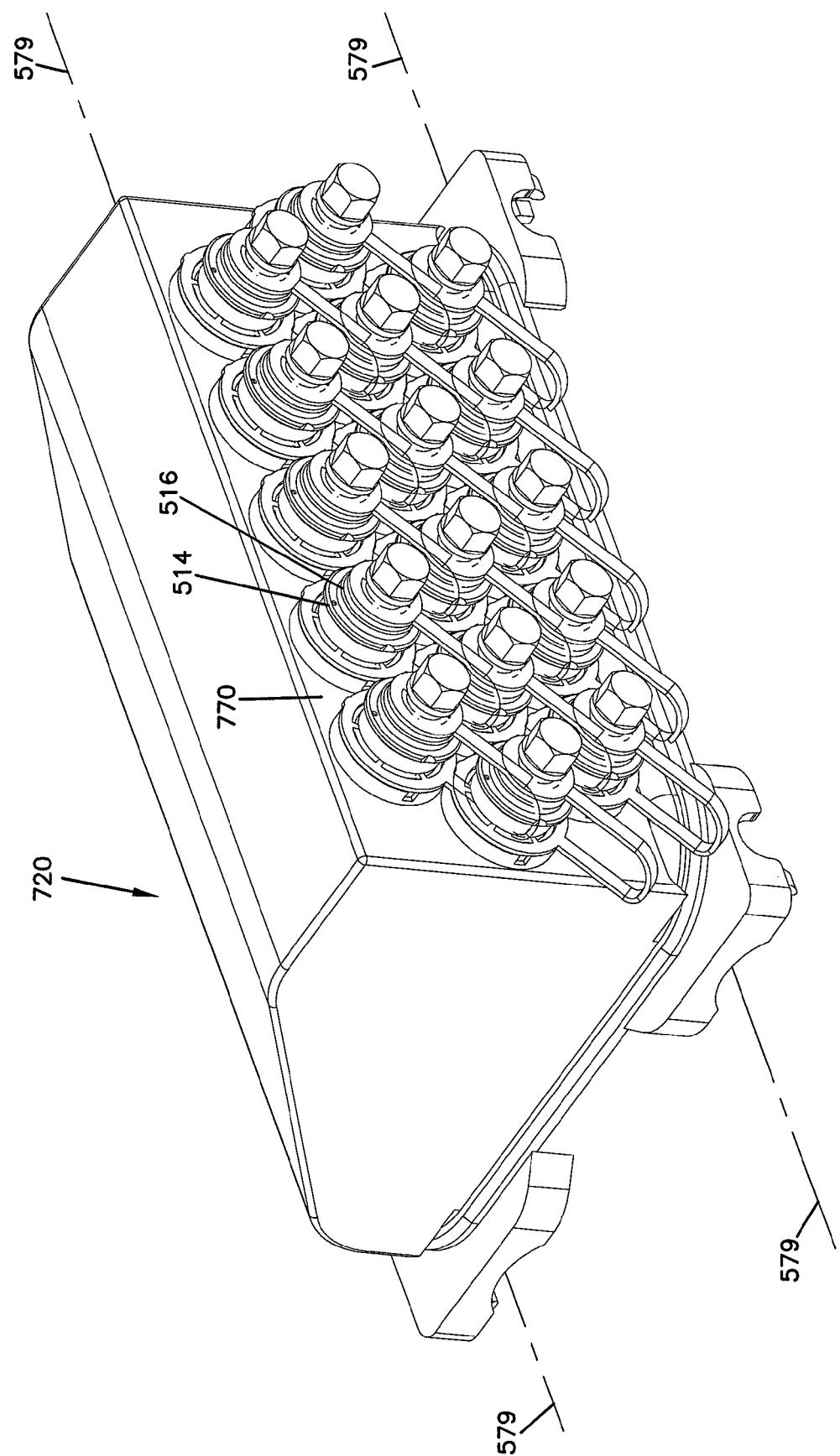
FIG. 20 shows a further wall box front cover in accordance with the principles of the present disclosure.

FIG. 20 shows another front cover 720 that can be pivotally mounted to the front side of the main body 216. The front cover 720 includes an adapter mounting wall 770 to which a plurality of the fiber optic adapters 514 are mounted with the inner ports 518 of the adapters 514 located inside the front cover 720 and the outer ports 516 accessible from outside the cover 720. The adapter mounting wall 770 extends generally in a front-to-back direction and is generally parallel to the through-cable routing axes 579. The fiber optic adapters 514 are oriented such that drop cables connected to the fiber optic adapters 514 can be routed in a direction generally perpendicular to the though-cable routing axes 579. Additionally, when the wall box is mounted to a structure such as a wall, the cable that passes through the wall box as well as the drop cables connected to the fiber optic adapters 514 can all be routed in a direction generally parallel to the wall to which the wall box is mounted. For example, if the wall box is mounted with the though-cable passing along the wall and through the wall box in a generally horizontal direction, drop cables connected to the fiber optic adapters 514 can be routed away from the wall box along the wall in a generally vertical orientation.

Figure 21:
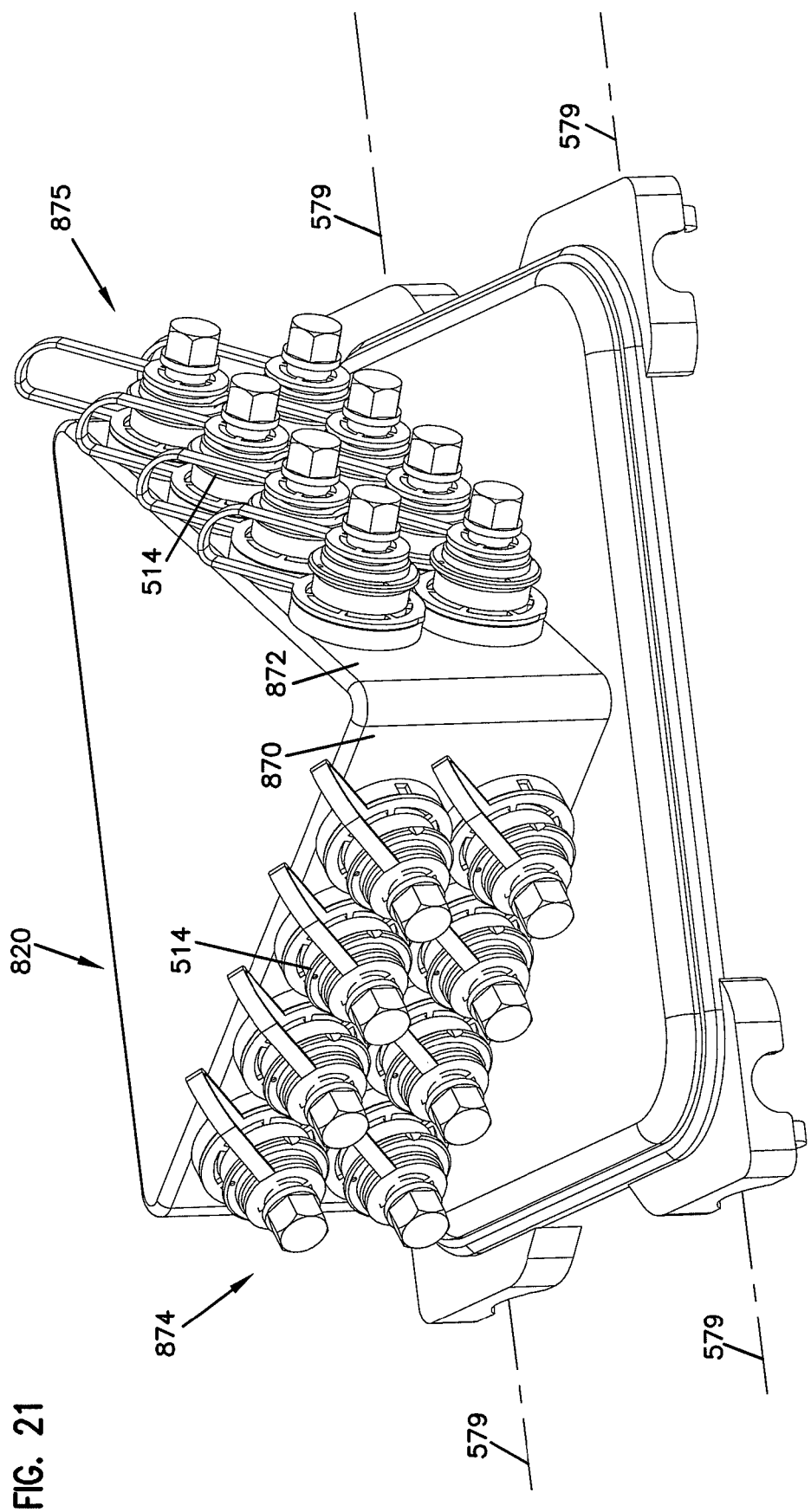
FIG. 21 shows still another wall box front cover in accordance with the principles of the present disclosure.

FIG. 21 illustrates still another front cover 820 in accordance with the principles of the present disclosure. The front cover 820 is adapted to be pivotally mounted to the front side of the main body 216. The front cover 820 includes a first adapter mounting wall 870 and a second adapter mounting wall 872. The first and second adapter mounting walls 870, 872 are angled relative to one another and define a generally V-shaped configuration. Each of the adapter mounting walls 870, 872 defines a plurality of openings for receiving fiber optic adapters 514. A first group of fiber optic adapters 874 is mounted at the first adapter mounting wall 870, and a second group of fiber optic adapters 875 is mounted at the second adapter mounting wall 872. The adapter mounting walls 870, 872 are oriented within planes that define oblique angles with respect to the through-cable routing axes 579. The first adapter mounting wall 870 faces partially toward cable exit/enter openings 232 defined at a first side of the wall box while the second adapter mounting wall 872 faces partially toward cable exit/enter openings 232 located at a second, opposite side of the wall box. When the wall box is mounted to a wall, the though-cable that is passed through the wall box as well as the drop cables can be routed away from the wall box in a direction generally parallel to the wall to which the wall box is mounted. For example, in one embodiment, the wall box can be mounted so that the though-cable passes through the wall box in a generally horizontal orientation extending from left to right, drop cables connected to the fiber optic adapters 514 mounted on the first adapter mounting wall 870 are routed downwardly and to the right of the wall box, and drop cables connected to the fiber optic adapters 514 mounted to the second adapter wall 872 can be routed downwardly and to the left of the wall box. Of course, as with any of the embodiments disclosed herein, the wall box can be mounted in any orientation as needed by the end user. Therefore, the above mounting configuration is but one example of how the wall box may be mounted.

Figure 22:
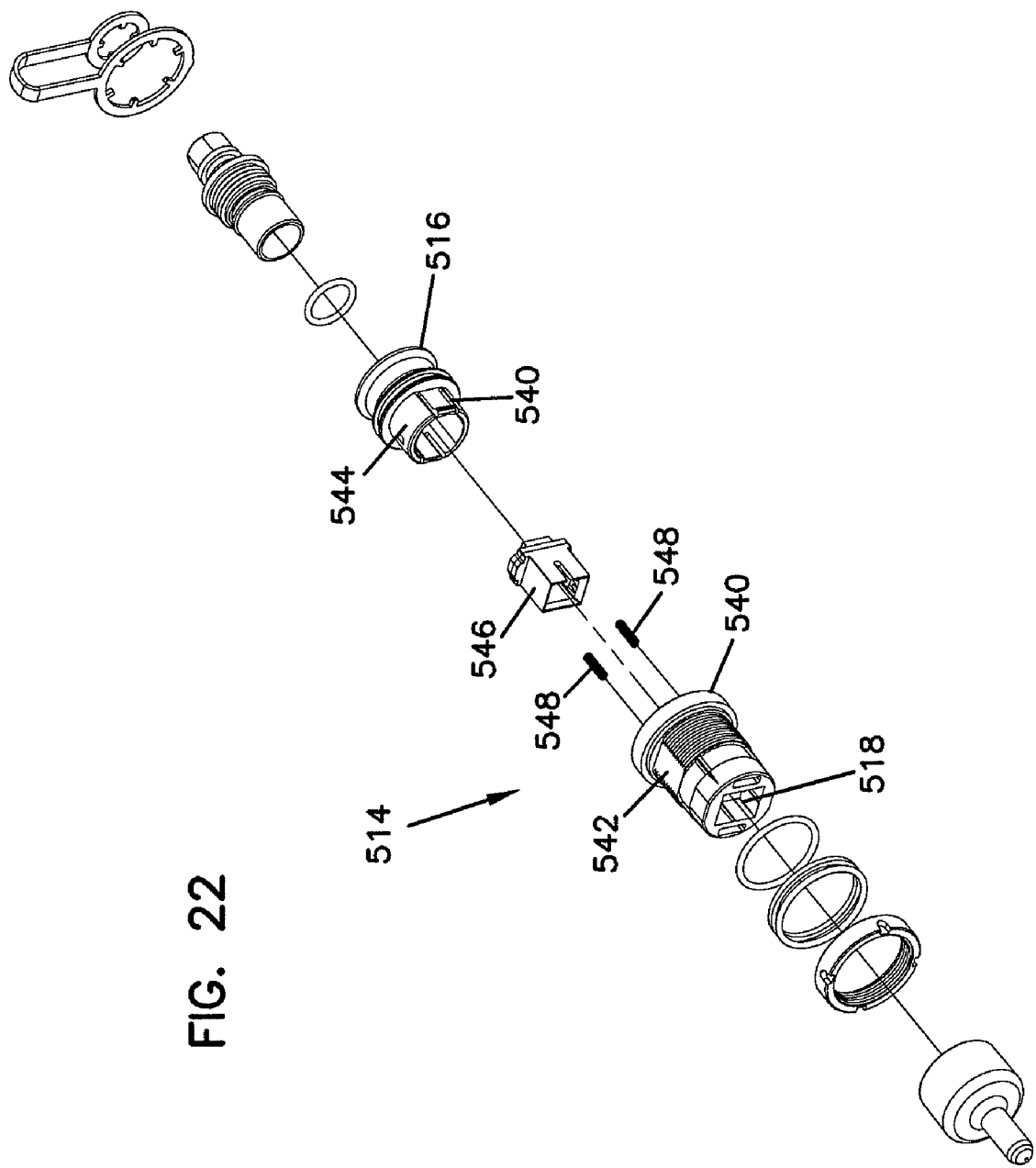
FIG. 22 is an exploded view of a fiber optic adapter suitable for use with the wall box devices of FIGS. 16-21.

FIG. 22 illustrates one of the fiber optic adapters 514 in isolation from the wall boxes. The fiber optic adapter 514 includes a main housing 540 having a first piece 542 that defines the inner port 518 of the fiber optic adapter 514 and a second piece 544 that defines the outer port 516 of the fiber optic adapter 514. The first and second pieces 542, 544 can be interconnected by a snap-fit connection to form the main housing 540. A split sleeve housing 546 mounts within the interior of the main housing 540. Springs 548 bias the split sleeve housing 546 toward the outer port 516 and allow the split sleeve housing 546 to float within the interior of the main housing 540. As shown in FIG. 22, the split sleeve housing 546 houses a standard split sleeve 550 that is coaxially aligned with a center axis 552 of the fiber optic adapter 514. The split sleeve 550 includes a first end 554 that faces toward the inner port 518 of the fiber optic adapter 514 and a second end 556 that faces toward the outer port 516 of the fiber optic adapter 514. The fiber optic adapter 514 mounts within one of the adapter mounting openings defined by the wall boxes. The fiber optic adapter 514 is retained within the adapter mounting opening by a retention nut 560 threaded on exterior threads defined by the first piece 542 of the main housing 540. When the retention nut 560 is threaded into place, the corresponding adapter mounting wall is captured between the retention nut 560 and a shoulder 564 of the main housing 540. A sealing member 566 is compressed between the main housing 540 and the adapter mounting wall to provide an environmental seal about the adapter mounting opening.

Figure 23:
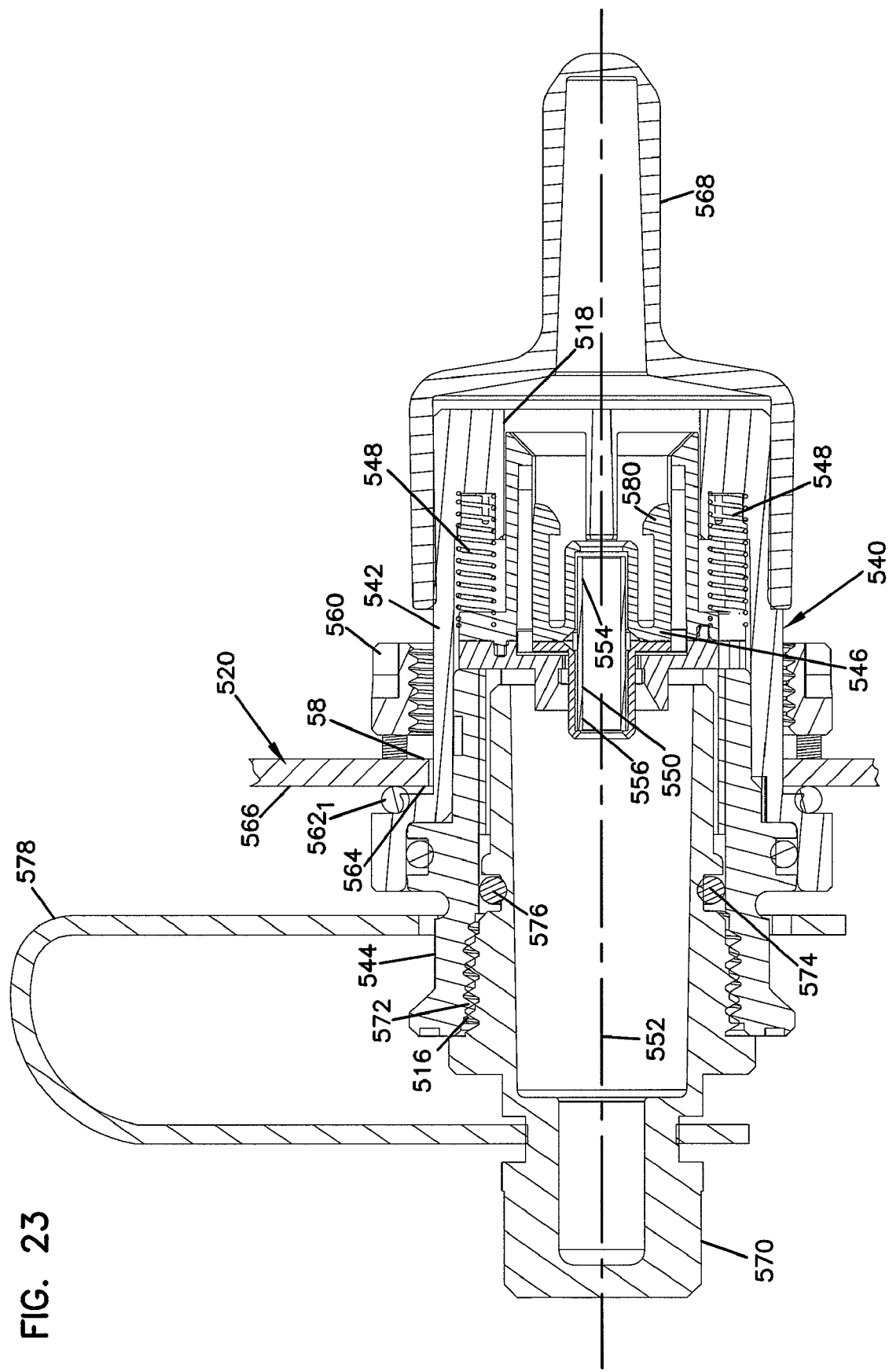
FIG. 23 is a longitudinal cross-sectional view of the fiber optic adapter of FIG. 22.

As shown in FIG. 23, a dust cap 568 is shown mounted covering the inner port 518 of the fiber optic adapter 514 and a plug 570 is shown mounted within the outer port 516 of the fiber optic adapter 514. The plug 570 is threaded within internal threads 572 defined within the outer port 516. The plug 570 also includes a sealing member 574 (e.g., an O-ring) that engages a sealing surface 576 within the outer port 516 to provide an environmental seal between the main housing 540 and the plug 570. A strap 578 secures the plug 570 to the main housing 540 to prevent the plug from being misplaced when removed from the outer port 516.

During assembly of the wall boxes, the fiber optic adapters 514 are mounted within the adapter mounting openings defined through the front covers of the wall boxes. After installation of the fiber optic adapters 514, the dust caps 568 can be removed to allow the fiber optic connectors 530 terminated to the pigtail optical fibers 528 spliced to corresponding fibers of the main cable to be inserted into the inner ports 518. When the inner fiber optic connectors 530 are inserted into the inner ports 518, ferrules of the inner fiber optic connectors 530 are received within the first ends 554 of the split sleeves 550, and clips 580 function to retain the inner fiber optic connectors 530 within the inner ports 518.

Figure 24:
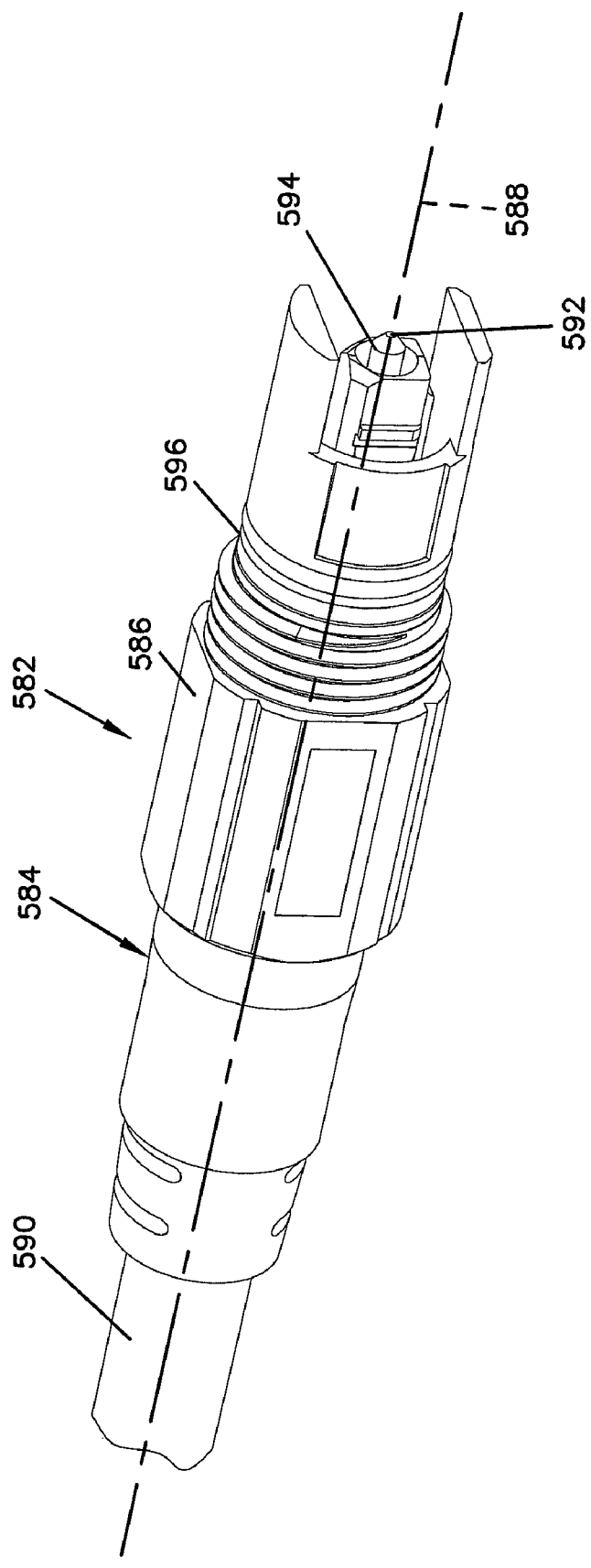
FIG. 24 shows a fiber optic connector adapted to be inserted in an outer port of the fiber optic adapter of FIGS. 22 and 23.

When it is desired to optically couple a drop cable to one of the wall boxes, the plug 570 of one of the fiber optic adapters 514 is removed from its corresponding outer port 516 to allow an exterior fiber optic connector terminated to the drop cable to be inserted into the outer port 516. An example exterior fiber optic connector 582 mounted at the end of a drop cable 590 is shown at FIG. 24. The exterior fiber optic connector 582 includes a housing 584 on which a retention nut 586 is rotatably mounted. The retention nut 586 can be manually rotated about a central axis 588 of the exterior fiber optic connector 582. The drop cable 590 includes an optical fiber 592 having an end portion mounted within a ferrule 594 supported at one end of the housing 584. When the exterior fiber optic connector 582 is inserted within the outer port 516, the ferrule 594 is received within second end 556 of the split sleeve 550. In this way, the split sleeve 550 holds the ferrule of the inner fiber optic connector 530 in coaxial alignment with the ferrule 594 of the exterior fiber optic connector 582. By aligning the ferrules, the corresponding optical fibers 528, 592 held within the ferrules are placed in coaxial alignment thereby allowing light signals to be transferred from fiber to fiber. The exterior fiber optic connector 582 is retained within the outer port 516 by threading the retention nut 586 into the internal threads 572. Additionally, the exterior fiber optic connector 582 includes a sealing member 596 (e.g., an O-ring) that engages the sealing surface 576 to provide an environmental seal between the exterior fiber optic connector 582 and the fiber optic adapter 514. With the ends of the optical fibers 528, 592 aligned, fiber optic signals can readily be transmitted between the optical fibers 528, 592.

In certain embodiments of the present disclosure, the wall box can be relatively small so as to occupy a minimal amount of space on a wall or other structure to which the wall box may be mounted. One example wall box can define a wall footprint (i.e., a planform or outer perimeter) less than or equal to about 100 square inches.

The above specification provides examples of how certain aspects may be put into practice. It will be appreciated that the aspects can be practiced in other ways than those specifically shown and described herein without departing from the spirit and scope of the present disclosure.

What is claimed is:

1. A wall box comprising:
   an enclosure including a main body with an open front side, the enclosure also including a front cover for selectively opening and closing the open front side of the main body;
   the enclosure including a first side defining a first cable entrance/exit opening and an oppositely disposed second side defining a second cable entrance/exit opening, the first and second cable entrance/exit openings being co-axially aligned;
   the main body defining an open region through an exterior wall of the main body, the open region extending from the first cable entrance/exit opening to the second cable entrance/exit opening, wherein the open region is adapted to allow a cable to be laterally inserted through the open region and into an interior of the enclosure; and
   the enclosure including a cable cover that is removably mounted to the main body to cover the open region, the cable cover being a separate component from the front cover, the cable cover extending from the first cable entrance/exit opening to the second cable entrance/exit opening and defining at least a portion of a rear wall of the enclosure.

2. The wall box of claim 1, wherein the main body includes a cable storage spool structure positioned within an interior of the main body.

3. The wall box of claim 1, wherein the main body includes a plurality of bend radius limiters positioned within an interior of the main body about which excess cable can be looped.

4. The wall box of claim 3, wherein the plurality of bend radius limiters includes four bend radius limiters.

5. The wall box of claim 1, further comprising a splice tray that mounts within the enclosure, the splice tray including a panel having a front side and a back side, the splice tray including a perimeter wall that extends forwardly from the panel and a spool that projects rearwardly from the panel, the panel defining one or more fiber routing openings that extend through the panel, and the splice tray including one or more bend radius limiting structures at the front of the panel about which optical fiber can be looped for storage.

6. The wall box of claim 3, further comprising a splice tray that mounts within the enclosure, the splice tray including a panel having a front side and a back side, the splice tray a spool that projects rearwardly from the panel and nests inside the bend radius limiters of the main body.

7. The wall box of claim 1, further comprising fiber optic adapters mounted to the front cover of the enclosure, the first optic adapters including first ports positioned inside the enclosure and second ports accessible from outside the enclosure.

8. The wall box of claim 7, wherein the fiber optic adapters define central axes that are generally parallel to a cable pass-though axis defined by the first and second cable entrance/exit openings.

9. The wall box of claim 8, wherein the fiber optic adapters include a first group having outer ports that face in a same direction as the first cable entrance/exit opening, and a second group having outer ports that face in a same direction as the second cable entrance/exit opening.

10. The wall box of claim 8, wherein the fiber optic adapters define central axes that are generally perpendicular to a cable pass-though axis defined by the first and second cable entrance/exit openings and that are generally parallel to a rear wall of the enclosure.

11. The wall box of claim 8, wherein the fiber optic adapters define central axes that are generally perpendicular to a cable pass-though axis defined by the first and second cable entrance/exit openings and that generally do not extend in a front-to-back orientation relative to the enclosure.

12. The wall box of claim 1, wherein the enclosure defines a footprint less than 100 square inches.

13. The wall box of claim 7, wherein the front cover includes first and second adapter mounting panels that are angled relative to one another so as to define a v-shaped configuration, wherein a first group of the fiber optic adapters are mounted at the first adapter mounting panel and are angled such that the outer ports of the fiber optic adapters face partially toward the first cable entrance/exit opening, and wherein a second group of the fiber optic adapters are mounted at the second adapter mounting panel and are angled such that the outer ports of the fiber optic adapters face partially toward the second cable entrance/exit opening.

14. The wall box of claim 7, wherein the front cover defines an internal cavity in which the inner ports of the fiber optic adapters are located, wherein the front cover includes a door for accessing the internal cavity of the cover without opening the front cover relative to the main body, and wherein the wall box includes a wall that separates the internal cavity of the front cover from an internal region of the main body when the front cover is closed relative to the main body.

15. The wall box of claim 1, wherein the cable cover defines a rear corner of the enclosure.

16. The wall box of claim 1, wherein the cable cover is moved in a rearward direction to remove the cable cover from the main body.

17. The wall box of claim 1, wherein the cable cover is moved in a direction generally parallel to a rear wall of the enclosure to remove the cable cover from the main body.

18. The wall box of claim 1, wherein cable clamps are located at the first and second cable entrance/exit openings, wherein each cable clamp includes a first half-cylinder integral with the cable cover and a second half-cylinder integral with the main body.

* * * * *